United States Patent
Sugiyama

(10) Patent No.: US 9,904,280 B2
(45) Date of Patent: Feb. 27, 2018

(54) SUBSTRATE TREATMENT APPARATUS AND CONTROL DEVICE

(71) Applicant: EBARA CORPORATION, Tokyo (JP)

(72) Inventor: Mitsunori Sugiyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 568 days.

(21) Appl. No.: 14/590,931

(22) Filed: Jan. 6, 2015

(65) Prior Publication Data

US 2015/0192921 A1    Jul. 9, 2015

(30) Foreign Application Priority Data

Jan. 7, 2014 (JP) .................. 2014-001091
Feb. 4, 2014 (JP) .................. 2014-019436
Feb. 4, 2014 (JP) .................. 2014-019437

(51) Int. Cl.
*G06F 19/00* (2011.01)
*G05B 19/418* (2006.01)

(52) U.S. Cl.
CPC .. *G05B 19/418* (2013.01); *G05B 2219/45031* (2013.01); *Y02P 90/02* (2015.11)

(58) Field of Classification Search
None
See application file for complete search history.

(56) References Cited

U.S. PATENT DOCUMENTS 5,555,177 A * 9/1996 Simmons ............. G05B 19/042
                                                            134/902
2006/0166503 A1 * 7/2006 Sasaki .................. B24B 37/042
                                                            438/692
2009/0033616 A1 * 2/2009 Miyagi ............... G06F 3/04883
                                                            345/104

FOREIGN PATENT DOCUMENTS

| JP | 2000-020464 A | 1/2000 |
|---|---|---|
| JP | 2004-337987 A | 12/2004 |
| JP | 2005-85784 A | 3/2005 |
| JP | 2006-093494 A | 4/2006 |
| JP | 3949096 B | 7/2007 |
| JP | 2007-257476 A | 10/2007 |
| JP | 2009-117648 A | 5/2009 |
| JP | 2009-140191 A | 6/2009 |
| JP | 2010-103486 A | 5/2010 |
| JP | 2011-187874 A | 9/2011 |

* cited by examiner

*Primary Examiner* — Wissam Rashid
(74) *Attorney, Agent, or Firm* — Baker & Hostetler LLP

(57) ABSTRACT

The present invention efficiently executes a plurality of functions of a substrate treatment apparatus. A control device 5 includes: a plurality of software applications (interface-related APSW 510 and control-related APSW 520) configured to execute each function of treatments concerning a CMP apparatus; and a shared memory 540 which stores information that is used in the plurality of software applications therein. The plurality of software applications include a task monitoring software application 530 which monitors whether abnormality has occurred in the plurality of software applications or not. The task monitoring software application 530 restarts the software application in which the abnormality has occurred, when the abnormality has occurred in any of the plurality of software applications, and makes the other software applications continue the respective processes.

9 Claims, 21 Drawing Sheets

SUBSTRATE TREATMENT APPARATUS AND CONTROL DEVICE

CROSS-REFERENCE TO RELATED APPLICATION

This application is based upon and claims the benefit of priority of the prior Japanese Patent Application No. 2014-001091, filed on Jan. 7, 2014, Japanese Patent Application No. 2014-019436, filed on Feb. 4, 2014, and Japanese Patent Application No. 2014-019437, filed on Feb. 4, 2014, the entire contents of which are incorporated herein by reference.

BACKGROUND OF THE INVENTION

Field of the Invention

The present invention relates to a control device for a substrate treatment apparatus, a substrate treatment apparatus, and a display control device.

Description of the Related Art

In recent years, a substrate treatment apparatus is used for subjecting a substrate such as a semiconductor wafer to various treatments. One example of the substrate treatment apparatus includes a CMP (Chemical Mechanical Polishing) apparatus for performing a polishing treatment of a substrate.

The CMP apparatus includes: a polishing unit for performing a polishing treatment of a substrate; a cleaning unit for performing a cleaning treatment and a drying treatment of the substrate; and a loading/unloading unit for delivering the substrate to the polishing unit and also receiving the substrate which has been subjected to the cleaning treatment and the drying treatment in the cleaning unit. In addition, the CMP apparatus includes a conveying unit which conveys the substrate in the polishing unit, the cleaning unit, and the loading/unloading unit. The CMP apparatus subjects the substrate sequentially to various treatments of the polishing, cleaning and drying treatments, while conveying the substrate by the conveying unit.

Incidentally, a control device is connected to the substrate treatment apparatus such as the CMP apparatus, and the control device performs various controls concerning the substrate treatment apparatus. Software application is installed in the control device. The software application performs various controls, for instance, such as an edit of various information (for instance, recipe and the like) concerning the substrate treatment, and an operation for testing the unit of the substrate treatment apparatus.

In addition, the substrate treatment apparatus is provided with a PC for operation, in order that a user monitors the state of the substrate treatment apparatus or performs various operations. A display device (user interface) of the PC for the operation displays a monitoring-related image and an operation-related image, for instance. The monitoring-related image is an image for monitoring how the substrate treatment apparatus operates. The operation-related image is an image which a user uses for performing various operations such as an operation for the substrate, a job operation and a recipe edit. The user monitors the state of the substrate treatment apparatus and performs various operations through the display device of the PC for the operation.

In addition, in the CMP apparatus, a substrate conveying test is performed for confirming whether the substrate is properly conveyed in the CMP apparatus or not, in addition to a main operation of actually subjecting the substrate to treatments such as polishing and cleaning.

The substrate conveying test is generally a test of arranging a carrier which accommodates a substrate for a test therein, in a predetermined place, subjecting the carrier to loading treatment, thereby approaching the carrier to the CMP apparatus, and docking the carrier with the CMP apparatus. Subsequently, the substrate conveying test continues executing a job concerning the test conveyance for the substrate, thereby taking out the substrate from the carrier, conveying the substrate in the CMP apparatus, and returning the substrate which has been conveyed to the carrier.

Subsequently, the substrate conveying test subjects the carrier to unloading treatment, thereby moving the carrier away from the CMP apparatus, and returning the carrier to the predetermined place.

CITATION LIST

Patent Literature

Patent Literature 1: Japanese Patent No. 3949096
Patent Literature 2: Japanese Patent Laid-Open No. 2005-85784
Patent Literature 3: Japanese Patent Laid-Open No. 2010-103486

In a conventional technology, it has not been considered to efficiently execute a plurality of functions of the substrate treatment apparatus.

Specifically, in a conventional control device, various functions which are executed by the control device have been achieved by one software application. In this case, when abnormality has occurred in this software application, for instance, all of the plurality of functions of the substrate treatment apparatus have become incapable of being executed until the substrate treatment apparatus is recovered by a restart of the software application, or the like.

For this reason, as for one aspect of the present invention, an object is to efficiently execute the plurality of functions of the substrate treatment apparatus.

However, in the conventional technology, it has not been considered to enhance the usability concerning the user interface of the substrate treatment apparatus.

In other words, in the substrate treatment apparatus, there exist various operation states (execution of process in each unit, automatic conveyance test for substrate, assembly of substrate treatment apparatus, and the like). On the other hand, in the conventional technology, the size and the arrangement position of the image which is displayed on the display device have been fixed at a default value, regardless of the type of operation. For instance, the monitoring-related image is arranged in a left-half region of a screen of the display device, and the operation-related image is arranged in a right-half region thereof; and it has been difficult to adjust the size or the arrangement position of each of the images. As a result, it has been difficult for a user to achieve optimal image arrangement which matches the type of the operation of the substrate treatment apparatus, and the usability of a user interface has been poor.

For this reason, in one aspect of the present invention, an object is to enhance the usability concerning the user interface of the substrate treatment apparatus.

In addition, in a conventional technology, it has not been considered to efficiently execute a plurality of jobs concerning the test conveyance of the substrate.

In other words, in the conventional technology, when one job is executed, loading treatment and unloading treatment for the carrier are included. Because of this, when the plurality of jobs are continuously executed, the loading treatment and the unloading treatment for the carrier exist between the executions of each of the jobs. As a result, the above circumstance has hindered the plurality of jobs from being efficiently executed.

For this reason, in one aspect of the present invention, an object is to efficiently execute the plurality of jobs concerning the test conveyance of the substrate. One aspect of the present invention is to solve at least one of the above described plurality of objects.

SUMMARY OF THE INVENTION

One aspect of the control device of the substrate treatment apparatus of the present invention has been designed with respect to the above described problems, and includes: a plurality of software applications configured to execute each function of treatments concerning the substrate treatment apparatus; and a storage device configured to store information that is used in the plurality of software applications therein, wherein the plurality of software applications include a monitoring software application which monitors whether abnormality has occurred in the plurality of software applications or not, wherein the monitoring software application restarts the software application in which the abnormality has occurred, when the abnormality has occurred in any of the plurality of software applications, and makes the other software applications continue the respective processes.

In one aspect of the control device of the substrate treatment apparatus of the present invention, the control device further includes a display device which functions as an interface of information, wherein the plurality of software applications include: an interface-related software application configured to execute input and output processes of the information through the display device; and a control-related software application configured to execute an operation process of the substrate treatment apparatus on the basis of the input information which has been input by the interface-related software application, or a storage process of the input information into the storage device; and the monitoring software application can restart the software application in which the abnormality has occurred, when the abnormality has occurred in any one of the interface-related software application and the control-related software application, and make the other software application continue the processing.

In one aspect of the control device of the substrate treatment apparatus of the present invention, the interface-related software application includes: at least two of a recipe-editing software application configured to edit recipes concerning the substrate treatment of the substrate treatment apparatus, a job-editing software application configured to edit jobs of the substrate treatment apparatus, which are created by combining the recipes, a unit adjustment software application configured to input a command for a test or adjustment of units included in the substrate treatment apparatus, and a parameter-editing software application configured to edit parameters which are used in the substrate treatment apparatus, wherein the monitoring software application can restart the software application in which the abnormality has occurred, when the abnormality has occurred in any of at least two in the recipe-editing software application, the job-editing software application, the unit adjustment software application and the parameter-editing software application, and make the other software applications continue the processing.

In one aspect of the control device of the substrate treatment apparatus of the present invention, the control-related software application includes: at least two of a recipe management software application configured to store recipes which have been edited through the recipe-editing software application, into the storage device, a job management/control software application configured to store the jobs which have been edited through the job-editing software application, into the storage device, and also make the substrate treatment apparatus operate on the basis of the jobs, a unit operation software application configured to make a unit included in the substrate treatment apparatus operate on the basis of a command which has been input through the unit adjustment software application, and a parameter management software application configured to store parameters which have been edited through the parameter-editing software application, into the storage device; wherein the monitoring software applications can restart the software application in which the abnormality has occurred, when the abnormality has occurred in at least two in the recipe management software application, the job management/control software application, the unit operation software application and the parameter management software application, and make the other software applications continue the processing.

One aspect of the substrate treatment apparatus of the present invention includes: any one of the above described control devices; a polishing unit configured to perform a polishing treatment of a substrate; a cleaning unit configured to perform a cleaning treatment and a drying treatment of the substrate; and a loading/unloading unit configured to deliver the substrate to the polishing unit and also receive the substrate which has been subjected to the cleaning treatment and the drying treatment in the cleaning unit.

One aspect of a display control device of the present invention has been designed with the above described problems, and includes: a receiving unit configured to receive a start-up command to software concerning the operation of the substrate treatment apparatus; and a display control unit configured to read out a plurality of images of different functions, which correspond to the start-up command that has been received by the receiving unit, from the storage unit, and make a display unit display the plurality of read out images, wherein the display control unit is configured so as to be capable of adjusting the sizes or the arrangement positions of the plurality of images which have been displayed on the display unit, on the basis of an adjustment instruction that has been input through an input operation unit.

One aspect of the display control device further includes a storage control unit configured to store the sizes and the arrangement positions of the plurality of images that have been displayed on the display unit in the storage unit, while making the sizes and the arrangement positions correspond to the type of the start-up command that has made the display unit display the plurality of images, wherein the display control unit can read out the sizes and the arrangement positions of the plurality of images, which correspond to the type of the start-up command that has been received by the receiving unit, from the storage unit, and make the display unit display the plurality of images on the basis of the read out sizes and arrangement positions of the plurality of images.

One aspect of the display control device further includes a storage control unit configured to store the sizes and the arrangement positions of the plurality of images that have been displayed on the display unit in the storage unit, while making the sizes and the arrangement positions correspond to the type of the start-up command that has made the display unit display the plurality of images and an identifier that has been input through the input operation unit, wherein the display control unit can read out the sizes and the arrangement positions of the plurality of images, which correspond to the type of the start-up command that has been received by the receiving unit, and the identifier that has been input through the input operation unit, from the storage unit, and make the display unit display the plurality of images on the basis of the read out sizes and arrangement positions of the plurality of images.

In one aspect of the display control device, the plurality of images include a base image which is used in common regardless of the type of the start-up command, and the display control unit can make the display unit display the base image with a fixed size and at a fixed arrangement position, regardless of the type of the start-up command which has been received by the receiving unit.

One aspect of the substrate treatment apparatus of the present invention includes: any one of the above described display control devices; a polishing unit configured to perform a polishing treatment of a substrate; a cleaning unit configured to perform a cleaning treatment and a drying treatment of the substrate; and a loading/unloading unit configured to deliver the substrate to the polishing unit, and also receive the substrate which has been subjected to the cleaning treatment and the drying treatment in the cleaning unit.

One aspect of the substrate treatment apparatus of the present invention has been designed with respect to the above described problems, and includes: a treatment chamber configured to polish or clean a substrate therein; and a control device configured to continuously execute a plurality of jobs concerning a test conveyance of the substrate in the treatment chamber, wherein the control device executes the plurality of jobs continuously executed not through an unloading treatment of moving a carrier which accommodates the substrate therein away from the treatment chamber, and not through a loading treatment of approaching the carrier to the treatment chamber, between the plurality of jobs.

In one aspect of the substrate treatment apparatus of the present invention, the control device can continuously execute the plurality of jobs in order of registration or at random.

In one aspect of the substrate treatment apparatus of the present invention, the carrier can accommodate a plurality of substrates therein, and the control device can execute the plurality of jobs to a substrate which has been assigned by the plurality of jobs, out of a plurality of substrates that have been accommodated in the carrier.

In one aspect of the substrate treatment apparatus of the present invention, the control device can determine whether the carrier is subjected to the loading treatment or not, before the first job out of the plurality of jobs is executed, and when the carrier is not subjected to the loading treatment, subject the carrier to the loading treatment and execute the first job.

In one aspect of the substrate treatment apparatus of the present invention, the substrate treatment apparatus can set the number of the substrates to be conveyed or the finish time, as a termination condition for continuous execution of the plurality of jobs, and the control device can determine whether the termination condition is satisfied or not while the plurality of jobs are continuously executed, and when the termination condition has been satisfied, subject the carrier to the unloading treatment and finish the substrate test.

In one aspect of the substrate treatment apparatus of the present invention, the plurality of carriers are provided, and the control device can simultaneously execute the plurality of jobs to the substrates which are accommodated in each of the plurality of carriers.

According to one aspect of the present invention, a plurality of functions of a substrate treatment apparatus can be efficiently executed.

One aspect of the present invention can enhance the usability concerning the user interface of the substrate treatment apparatus.

One aspect of the present invention can efficiently execute a plurality of jobs concerning the test conveyance of the substrate. One aspect of the present invention shows at least one effect out of the above described plurality of effects.

DETAILED DESCRIPTION OF THE PREFERRED EMBODIMENTS

A substrate treatment apparatus according to one embodiment of the present invention will be described below with reference to the drawings. A CMP apparatus will be described below as one example of the substrate treatment apparatus, but the substrate treatment apparatus is not limited to the CMP apparatus. In addition, the substrate treatment apparatus will be described below which includes a loading/unloading unit 2, a polishing unit 3 and a cleaning unit 4, but is not limited to this substrate treatment apparatus.

Firstly, a structure of the CMP apparatus will be described below, and then an efficient execution of a plurality of functions of the CMP apparatus will be described below.

<Substrate Treatment Apparatus>

Figure 1:
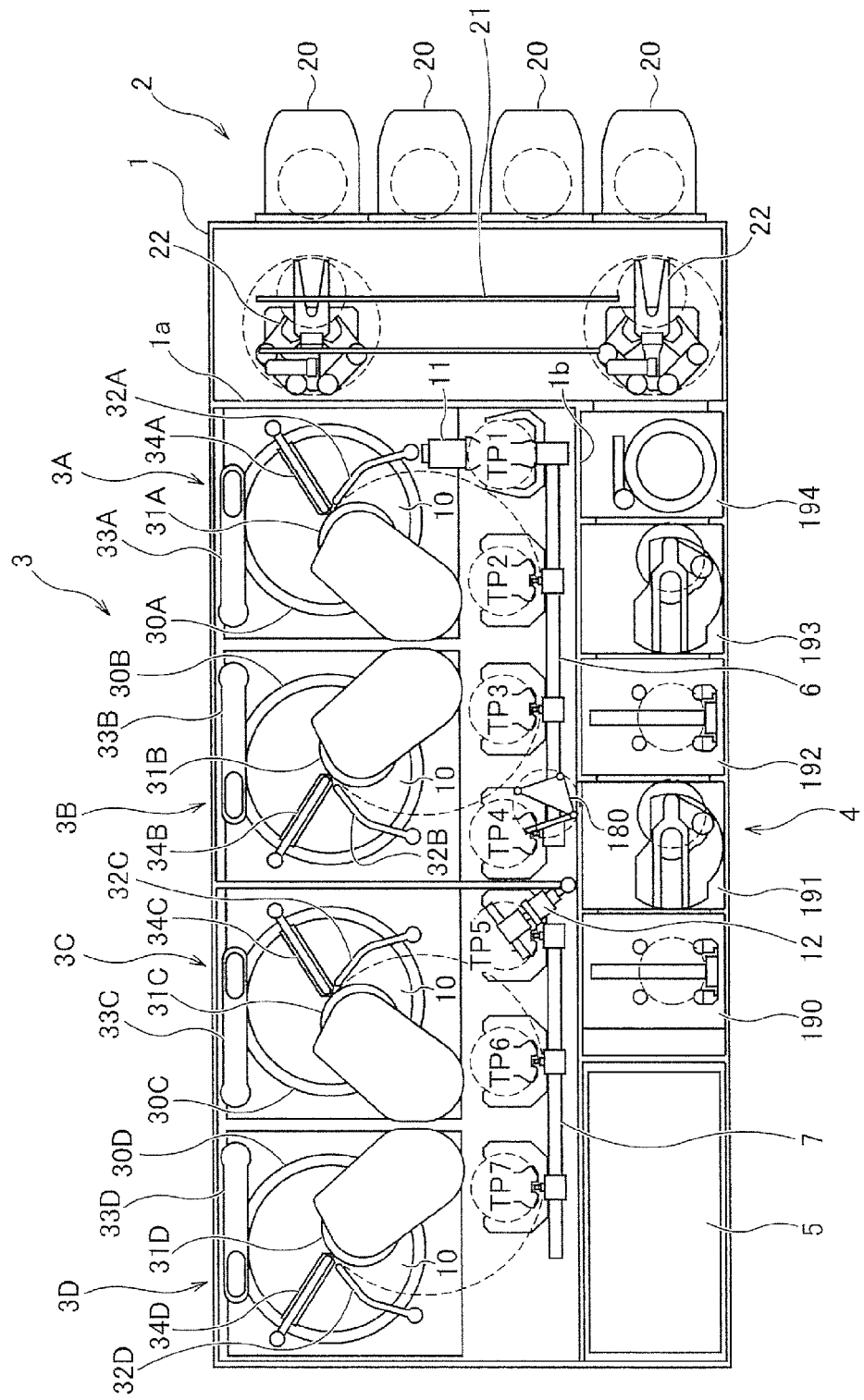
FIG. 1 is a plan view showing the whole structure of a substrate treatment apparatus of the present embodiment.

FIG. 1 is a plan view showing the whole structure of a substrate treatment apparatus according to one embodiment of the present invention. As is shown in FIG. 1, this CMP apparatus has a housing 1 which has an approximately rectangular shape. The inner part of the housing 1 is divided into a loading/unloading unit 2, a polishing unit 3 and a cleaning unit 4, by partition walls 1a and 1b. The loading/unloading unit 2, the polishing unit 3 and the cleaning unit 4 are each independently assembled, and are each independently exhausted. In addition, the cleaning unit 4 has a control device 5 which controls an operation of substrate treatment.

<Loading/Unloading Unit>

The loading/unloading unit 2 has two or more (in the present embodiment, four) front loading portions 20 on which wafer cassettes each of which stocks a large number of wafers (substrate) therein are mounted, respectively. These front loading portions 20 are arranged so as to be adjacent to the housing 1, and are arrayed in a width direction (direction perpendicular to longitudinal direction) of the substrate treatment apparatus. The front loading portion 20 is configured so as to be capable of mounting an open cassette, an SMIF (Standard Manufacturing Interface) pod or a FOUP (Front Opening Unified Pod) thereon. Here, the SMIF and the FOUP are closed containers each of which accommodates the wafer cassette therein and can keep an environment independent from an outer space by being covered with a partition wall.

In addition, a travelling mechanism 21 is installed in the loading/unloading unit 2 along the alignment of the front loading portions 20. Two conveyance robots (loader and conveyance mechanism) 22 are provided on this travelling mechanism 21, which can move along a direction in which the wafer cassettes are arrayed. The conveying robot 22 is structured so as to be capable of accessing the wafer cassette which is mounted on the front loading portion 20, by moving on the travelling mechanism 21. Each of the conveying robots 22 has two hands in upper and lower parts. The upper hand is used when returning a treated wafer to the wafer cassette. The lower hand is used when taking out a wafer before treatment from the wafer cassette. Thus, the upper and lower hands are structured to be capable of being separately used. Furthermore, the lower hand of the conveying robot 22 is structured so as to be capable of inverting the wafer by rotating around the shaft center thereof.

The loading/unloading unit 2 is a region in which the cleanest state needs to be kept. For this reason, the inside of the loading/unloading unit 2 is always kept at a higher pressure than any one of the outside of the CMP apparatus, the polishing unit 3 and the cleaning unit 4. The polishing unit 3 is the dirtiest region because of using slurry as a polishing liquid. Accordingly, a negative pressure is formed in the inside of the polishing unit 3, and the pressure thereof is kept at a lower pressure than the internal pressure of the cleaning unit 4. A filter fan unit (unillustrated) which has a clean air filter such as a HEPA filter, an ULPA filter and a chemical filter is provided in the loading/unloading unit 2. Clean air from which particles, toxic vapor and toxic gas have been removed always blows out from this filter fan unit.

<Polishing Unit>

The polishing unit 3 is a region in which the wafer is polished (flattened). The polishing unit 3 has a first polishing unit 3A, a second polishing unit 3B, a third polishing unit 3C and a fourth polishing unit 3D. These first polishing unit 3A, second polishing unit 3B, third polishing unit 3C and fourth polishing unit 3D are arrayed in the longitudinal direction of the substrate treatment apparatus, as is shown in FIG. 1.

As is shown in FIG. 1, the first polishing unit 3A is provided with a polishing table 30A on which a polishing pad 10 having a polishing surface is attached. The first polishing unit 3A is also provided with a top ring 31A for holding the wafer and polishing the wafer while pressing the wafer against the polishing pad 10 on the polishing table 30A. In addition, the first polishing unit 3A is provided with a polishing-liquid supply nozzle 32A for supplying the polishing liquid and a dressing liquid (for instance, pure water), to the polishing pad 10. In addition, the first polishing unit 3A is provided with a dresser 33A for dressing a polishing surface of the polishing pad 10. In addition, the first polishing unit 3A is provided with an atomizer 34A which converts a mixture fluid of a liquid (for instance, pure water) and a gas (for instance, nitrogen gas) or a liquid (for instance, pure water) into a mist form, and jets the mist onto the polishing surface.

Similarly, the second polishing unit 3B is provided with a polishing table 30B on which the polishing pad 10 is attached, a top ring 31B, a polishing-liquid supply nozzle 32B, a dresser 33B and an atomizer 34B. The third polishing unit 3C is provided with a polishing table 30C on which the polishing pad 10 is attached, a top ring 31C, a polishing-liquid supply nozzle 32C, a dresser 33C and an atomizer 34C. The fourth polishing unit 3D is provided with a polishing table 30D on which the polishing pad 10 is attached, a top ring 31D, a polishing-liquid supply nozzle 32D, a dresser 33D and an atomizer 34D.

The first polishing unit 3A, the second polishing unit 3B, the third polishing unit 3C and the fourth polishing unit 3D have the same structure, and accordingly the first polishing unit 3A will be described below.

Figure 2:
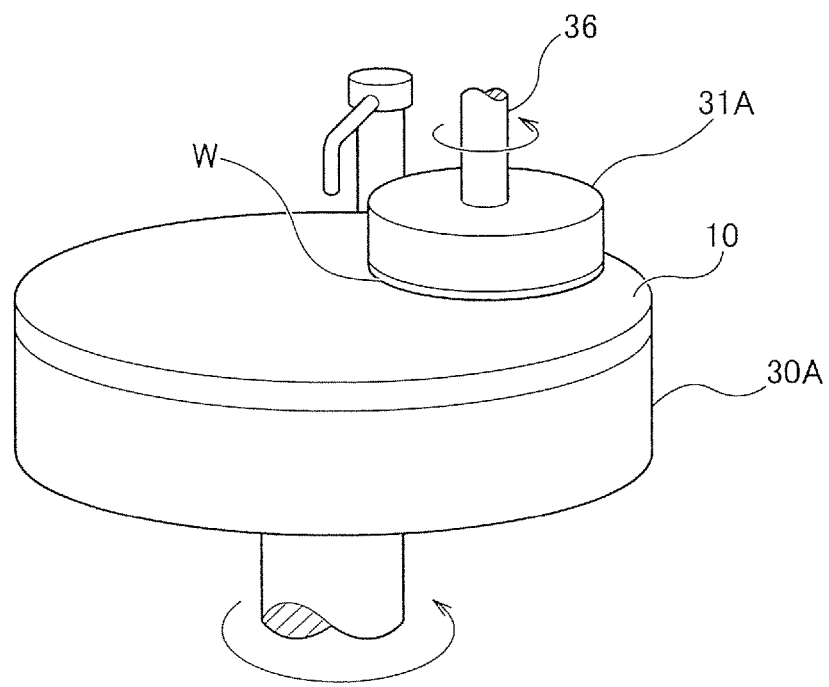
FIG. 2 is a perspective view schematically showing a polishing unit.

FIG. 2 is a perspective view schematically showing the first polishing unit 3A. The top ring 31A is supported by a top ring shaft 36. The polishing pad 10 is affixed on the upper face of the polishing table 30A, and the upper face of this polishing pad 10 constitutes a polishing surface which polishes a wafer W. Incidentally, fixed abrasive grains can also be used in place of the polishing pad 10. The top ring 31A and the polishing table 30A are structured so as to rotate around the respective shaft centers, as are shown by the arrows. The wafer W is held on the lower face of the top ring 31A by vacuum absorption. When the wafer W is polished, the polishing liquid is supplied to the polishing surface of the polishing pad 10 from the polishing-liquid supply nozzle 32A, and the wafer W which is an object to be polished is pressed against the polishing surface by the top ring 31A and is polished.

Next, a conveyance mechanism for conveying the wafer will be described below. As is shown in FIG. 1, a first linear transporter 6 is arranged so as to be adjacent to the first polishing unit 3A and the second polishing unit 3B. This first linear transporter 6 is a mechanism that conveys the wafer among four conveyance positions (first conveyance position TP1, second conveyance position TP2, third conveyance position TP3 and fourth conveyance position TP4, sequentially from side of loading/unloading unit), which are provided along a direction in which the polishing units 3A and 3B are arrayed.

In addition, a second linear transporter 7 is arranged so as to be adjacent to the third polishing unit 3C and the fourth polishing unit 3D. This second linear transporter 7 is a mechanism that conveys the wafer among three conveyance positions (fifth conveyance position TP5, sixth conveyance position TP6 and seventh conveyance position TP7, sequentially from side of loading/unloading unit), which are provided along a direction in which the polishing units 3C and 3D are arrayed.

The wafer is conveyed to the polishing units 3A and 3B, by the first linear transporter 6. The top ring 31A of the first polishing unit 3A is moved between the polishing position and the second conveyance position TP2, by a swing operation of the head of the top ring. Accordingly, the wafer is delivered to the top ring 31A at the second conveyance position TP2. Similarly, the top ring 31B of the second polishing unit 3B moves between the polishing position and the third conveyance position TP3, and the wafer is delivered to the top ring 31B at the third conveyance position TP3. The top ring 31C of the third polishing unit 3C moves between the polishing position and the sixth conveyance position TP6, and the wafer is delivered to the top ring 31C at the sixth conveyance position TP6. The top ring 31D of the fourth polishing unit 3D moves between the polishing position and the seventh conveyance position TP7, and the wafer is delivered to the top ring 31D at the seventh conveyance position TP7.

A lifter 11 for receiving the wafer from the conveying robot 22 is arranged in the first conveyance position TP1. The wafer is delivered to the first linear transporter 6 from the conveying robot 22 through this lifter 11. A shutter (unillustrated) is provided in the partition wall 1a so as to be positioned between the lifter 11 and the conveying robot 22, and is structured to be opened so that the wafer is delivered to the lifter 11 from the conveying robot 22, when the wafer is conveyed. In addition, a swing transporter 12 is arranged in a space surrounded by the first linear transporter 6, the second linear transporter 7 and the cleaning unit 4. This swing transporter 12 has a hand which can move between the fourth conveyance position TP4 and the fifth conveyance position TP5, and the wafer is delivered to the second linear transporter 7 from the first linear transporter 6, by the swing transporter 12. The wafer is conveyed to the third polishing unit 3C and/or fourth polishing unit 3D, by the second linear transporter 7. In addition, the wafer which has been polished in the polishing unit 3 is conveyed to the cleaning unit 4 through the swing transporter 12.

<Cleaning Unit>

Figure 3A:
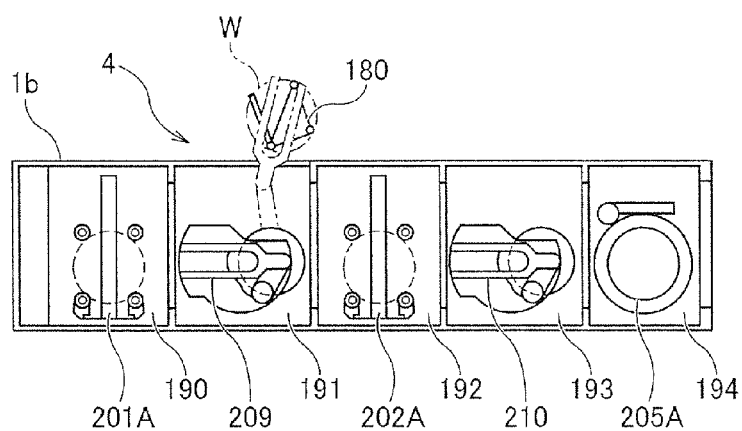
FIG. 3A is a plan view showing a cleaning unit.
Figure 3B:
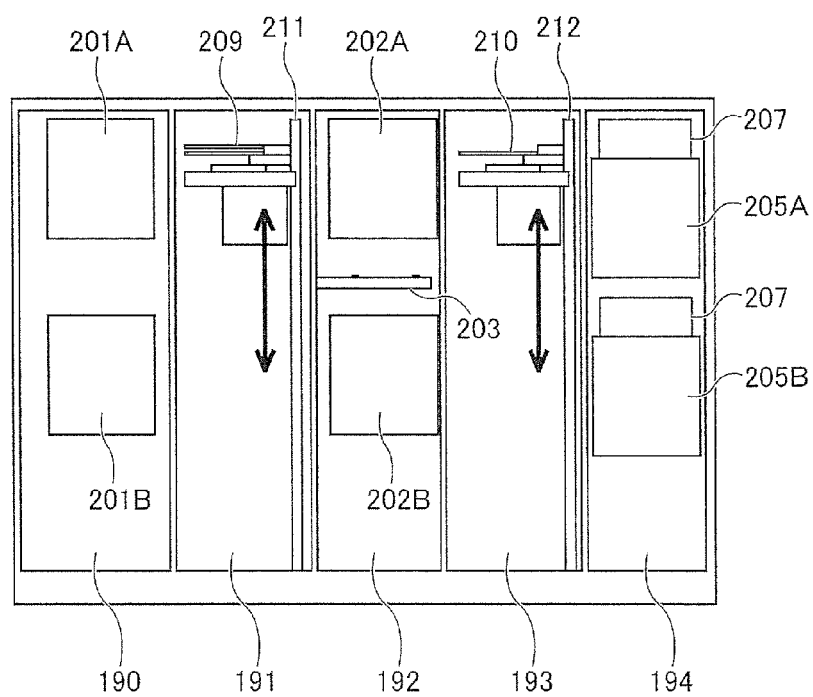
FIG. 3B is a side view showing the cleaning unit.

FIG. 3A is a plan view showing the cleaning unit 4, and FIG. 3B is a side view showing the cleaning unit 4. As is shown in FIG. 3A and FIG. 3B, the cleaning unit 4 is divided into a first cleaning chamber 190, a first conveying chamber 191, a second cleaning chamber 192, a second conveying chamber 193 and a drying chamber 194. In the first cleaning chamber 190, an upper primary cleaning module 201A and a lower primary cleaning module 201B are arranged which are arrayed in a vertical direction. The upper primary cleaning module 201A is arranged above the lower primary cleaning module 201B. Similarly, in the second cleaning chamber 192, an upper secondary cleaning module 202A and a lower secondary cleaning module 202B are arranged which are arrayed in the vertical direction. The upper secondary cleaning module 202A is arranged above the lower secondary cleaning module 202B. The primary and secondary cleaning modules 201A, 201B, 202A and 202B are cleaning machines which clean the wafer by using a cleaning liquid. These primary and secondary cleaning modules 201A, 201B, 202A and 202B are arrayed in a vertical direction, and accordingly can obtain such an advantage that a footprint area is small.

A temporary placing table 203 of the wafer is provided in between the upper secondary cleaning module 202A and the lower secondary cleaning module 202B. In the drying chamber 194, an upper drying module 205A and a lower drying module 205B are arranged which are arrayed in the vertical direction. These upper drying module 205A and lower drying module 205B are separated from each other. In the respective upper parts of the upper drying module 205A and the lower drying module 205B, filter fan units 207 and 207 are provided which supply clean air into the drying modules 205A and 205B, respectively. The upper primary cleaning module 201A, the lower primary cleaning module 201B, the upper secondary cleaning module 202A, the lower secondary cleaning module 202B, the temporary placing table 203, the upper drying module 205A and the lower drying module 205B are fixed to an unillustrated frame through a bolt or the like.

In the first conveying chamber 191, a first conveying robot (conveying mechanism) 209 is arranged which can vertically move, and in the second conveying chamber 193, a second conveying robot 210 is arranged which can vertically move. The first conveying robot 209 and the second conveying robot 210 are movably supported by support shafts 211 and 212, respectively, which extend in the vertical direction. The first conveying robot 209 and the second conveying robot 210 have driving mechanisms such as motors in the respective inner parts, and are structured so as to be capable of moving vertically along the respective support shafts 211 and 212. The first conveying robot 209 has two-tiered upper and lower hands, similarly to the conveying robot 22. The first conveying robot 209 is arranged at such a position that the lower hand thereof can access the above described temporary placing table 180, as is shown by a dotted line in FIG. 3(a). A shutter (unillustrated) provided in the partition wall 1b is structured to be opened when the lower hand of the first conveying robot 209 accesses the temporary placing table 180.

The first conveying robot 209 operates so as to convey the wafer W among the temporary placing table 180, the upper primary cleaning module 201A, the lower primary cleaning module 201B, the temporary placing table 203, the upper secondary cleaning module 202A and the lower secondary cleaning module 202B. When conveying the wafer (wafer having slurry deposited thereon) prior to cleaning, the first conveying robot 209 uses the lower hand, and when conveying the wafer after cleaning, uses the upper hand. The second conveying robot 210 operates so as to convey the wafer W among the upper secondary cleaning module 202A, the lower secondary cleaning module 202B, the temporary placing table 203, the upper drying module 205A and the lower drying module 205B. The second conveying robot 210 is provided with only one hand, because of conveying only a cleaned wafer. The conveying robot 22 shown in FIG. 1 takes out the wafer from the upper drying module 205A or the lower drying module 205B by using the upper hand thereof, and returns the taken out wafer to the wafer cassette. A shutter (unillustrated) provided in the partition wall 1a is structured to be opened when the upper hand of the conveying robot 22 accesses the drying modules 205A or 205B.

<Efficient Execution of Plurality of Functions of CMP Apparatus>

Next, an efficient execution of a plurality of functions of the CMP apparatus will be described below.

Figure 4:
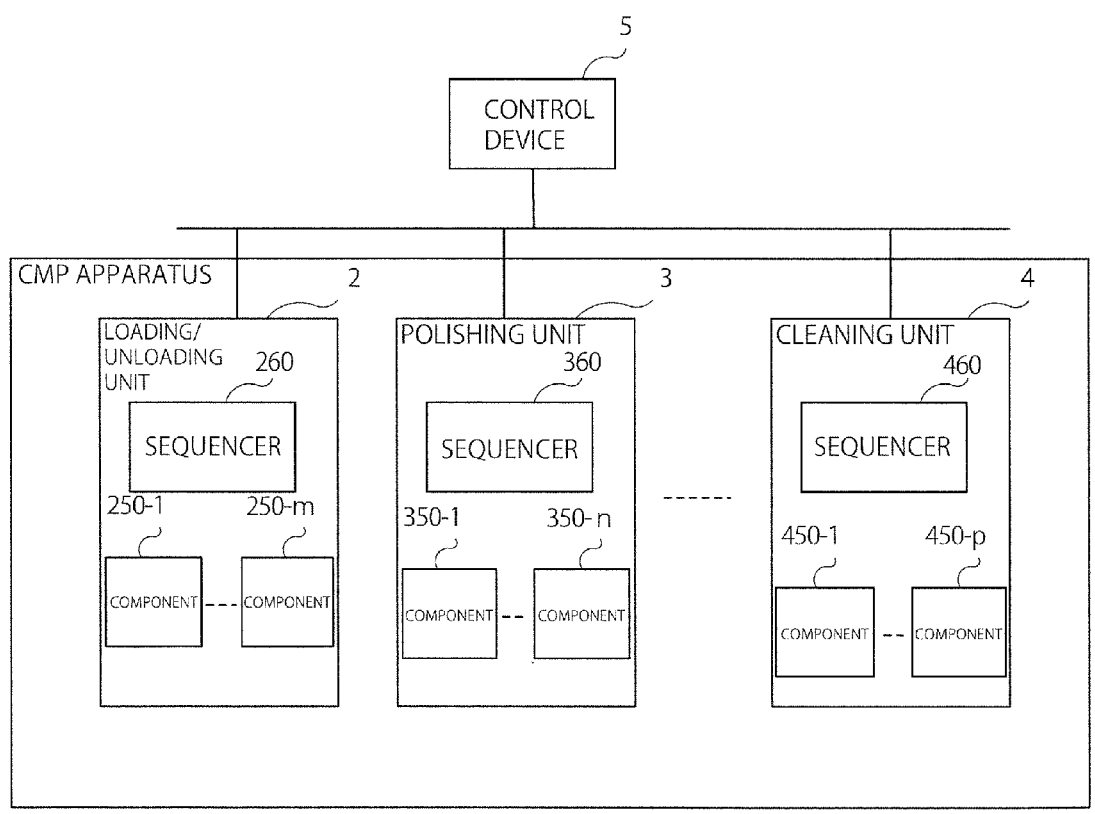
FIG. 4 is a view showing configurations of a CMP apparatus and a control device (PC for operation)

FIG. 4 is a view showing the configurations of the CMP apparatus and the control device (operation for PC). As has been described above, the CMP apparatus includes a plurality of units such as the loading/unloading unit 2, the polishing unit 3 and the cleaning unit 4. In addition, the loading/unloading unit 2 has a sequencer 260 for controlling the operations of a plurality of components 250-1 to 250-$m$ (conveying robot 22 and the like) in the loading/unloading unit 2 provided therein. In addition, the polishing unit 3 has a sequencer 360 for controlling the operations of a plurality of components 350-1 to 350-$n$ (polishing table, top ring and the like) in the polishing unit 3 provided therein. In addition, the cleaning unit 4 has a sequencer 460 for controlling the operations of a plurality of components 450-1 to 450-$p$ (cleaning module, conveying robot and the like) in the cleaning unit 4 provided therein.

The control device 5 is connected to the loading/unloading unit 2 (sequencer 260), the polishing unit 3 (sequencer 360), and the cleaning unit 4 (sequencer 460).

Figure 5:
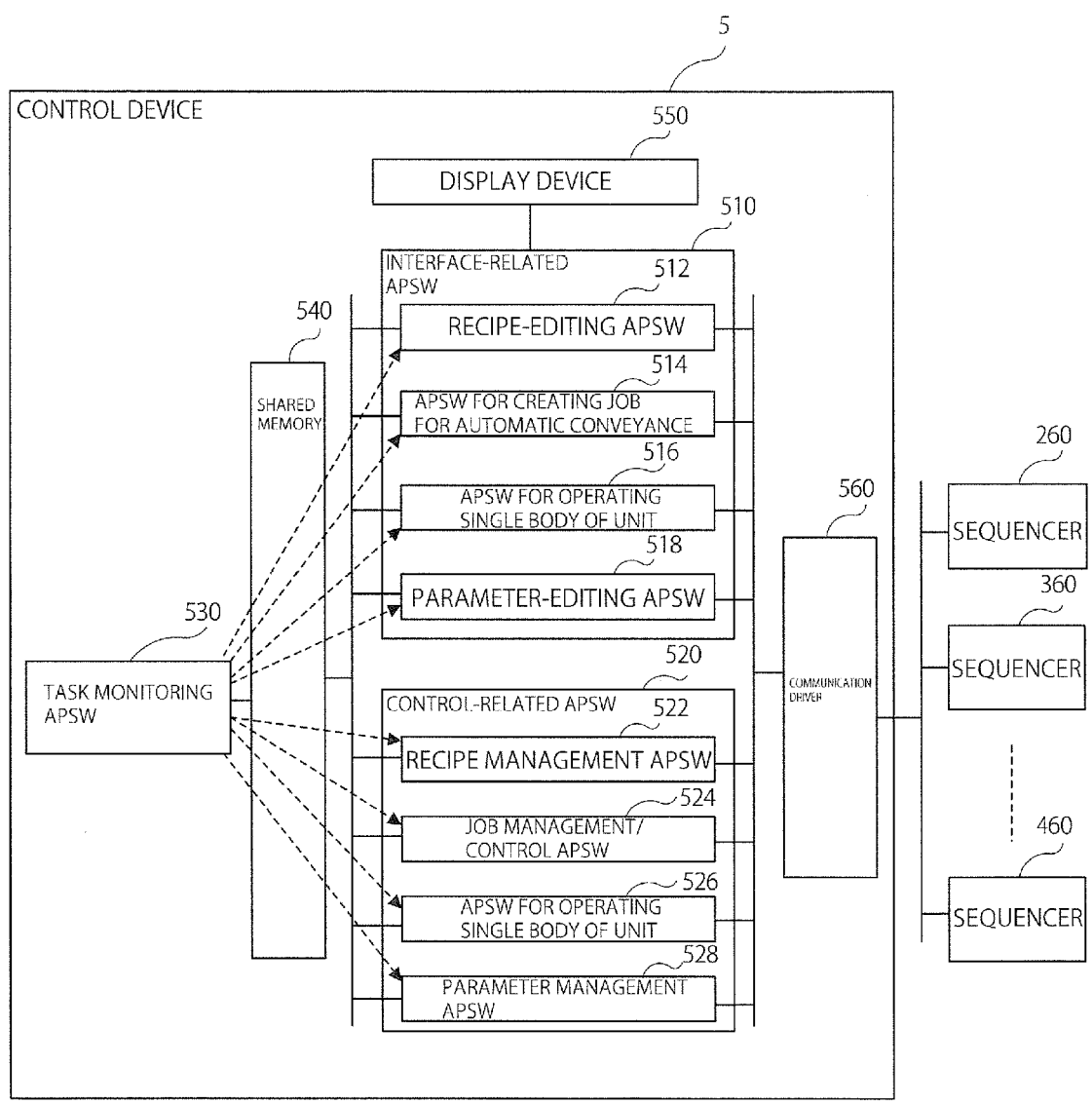
FIG. 5 is a view showing a configuration of the control device.

FIG. 5 is a view showing the configuration of the control device 5. The control device 5 is provided with a plurality of software applications for executing each function of treatments concerning the CMP apparatus. Specifically, the control device 5 is provided with an interface-related APSW (software application) 510, a control-related APSW 520 and a task monitoring APSW 530.

In addition, the control device 5 is provided with a shared memory 540, a display device 550 and a communication driver 560. The shared memory 540 is a storage device which is shared by the interface-related APSW 510, the control-related APSW 520 and the task monitoring APSW 530. The display device 550 is an interface to a user. The communication driver 560 is a driver for communicating between each of the interface-related APSW 510 and the control-related APSW 520, and each of the sequencers 260, 360 and 460.

The interface-related APSW 510 is a software application for executing processes of inputting and outputting information through the display device 550.

The control-related APSW 520 is a software application for executing a process of operating the CMP apparatus on the basis of the input information which has been input by the interface-related APSW 510, or a process of storing the input information into the shared memory 540.

In addition, the task monitoring APSW 530 is a software application which monitors whether abnormality has occurred in the plurality of software applications (interface-related APSW 510 and control-related APSW 520), or not. The task monitoring APSW 530 restarts the software application in which the abnormality has occurred, when the abnormality has occurred in any of the plurality of software applications, and makes the other software applications continue the respective processes.

When the recipe edition through the display device 550 is executed by the interface-related APSW 510, and simultaneously, the single-body test of the polishing unit 3 is executed by the control-related APSW 520, for instance, suppose that the abnormality has occurred in the interface-related APSW 510. In this case, the task monitoring APSW 530 restarts the interface-related APSW 510, and also makes the control-related APSW 520 continue the processing. In other words, the task monitoring APSW 530 does not restart all of the software applications, but restarts only the interface-related APSW 510.

Thereby, the single-body test of the polishing unit 3 is continued by the control-related APSW 520. As has been described above, in the present embodiment, the interface-related APSW 510 and the control-related APSW 520 are installed as separate software applications. Thereby, when abnormality has occurred in any one of the software applications, the processing of the software application in which abnormality does not occur can be continued. As a result, according to the present embodiment, the plurality of functions of the CMP apparatus can be efficiently executed.

<Interface-Related APSW>

Next, the details of the interface-related APSW 510 will be described below. The interface-related APSW 510 is provided with a recipe-editing APSW 512, an APSW 514 for creating jobs for automatic conveyance, an APSW 516 for operating a single body of a unit, and a parameter-editing APSW 518.

The recipe-editing APSW 512 is a software application for editing recipes concerning the substrate treatment of the CMP apparatus. The APSW 514 for creating jobs for automatic conveyance is a software application for editing jobs (JOBs) of the CMP apparatus, which are created by combining the recipes to each other.

The APSW 516 for operating a single body of a unit is a software application for inputting a command for a test or adjustment of the unit (loading/unloading unit 2, polishing unit 3 or cleaning unit 4) included in the CMP apparatus, into the corresponding unit. The parameter-editing APSW 518 is a software application for editing parameters which are used in the CMP apparatus.

Incidentally, the software applications included in the interface-related APSW 510 are not limited to the software applications shown in FIG. 5. For instance, a software application for displaying an image obtained by monitoring a predetermined portion of the CMP apparatus on the display device 550, and the like, can also be provided. In addition, a software application for displaying various historical data concerning the CMP apparatus on the display device 550, and the like, can also be provided.

Figure 6A:
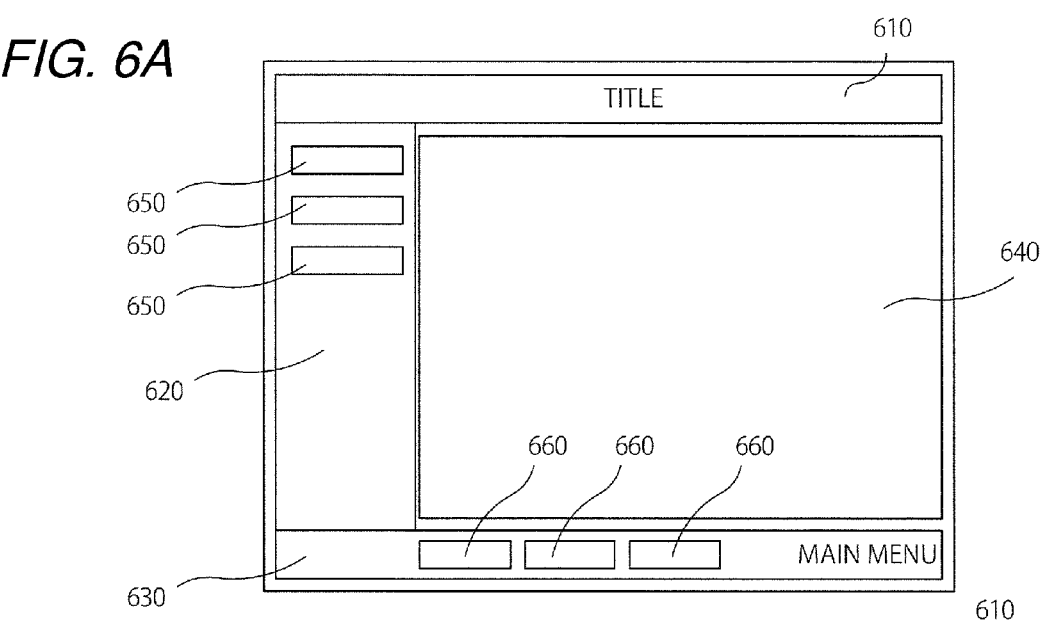
FIG. 6A is a view showing one example of a screen which is displayed on a display device by an interface-related APSW.
Figure 6B:
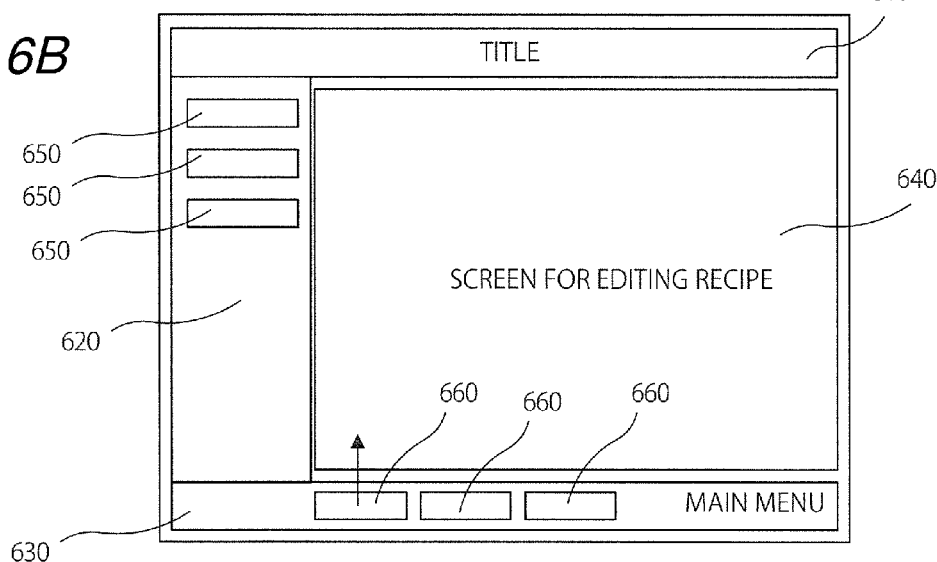
FIG. 6B is a view showing one example of the screen which is displayed on the display device by the interface-related APSW.
Figure 6C:
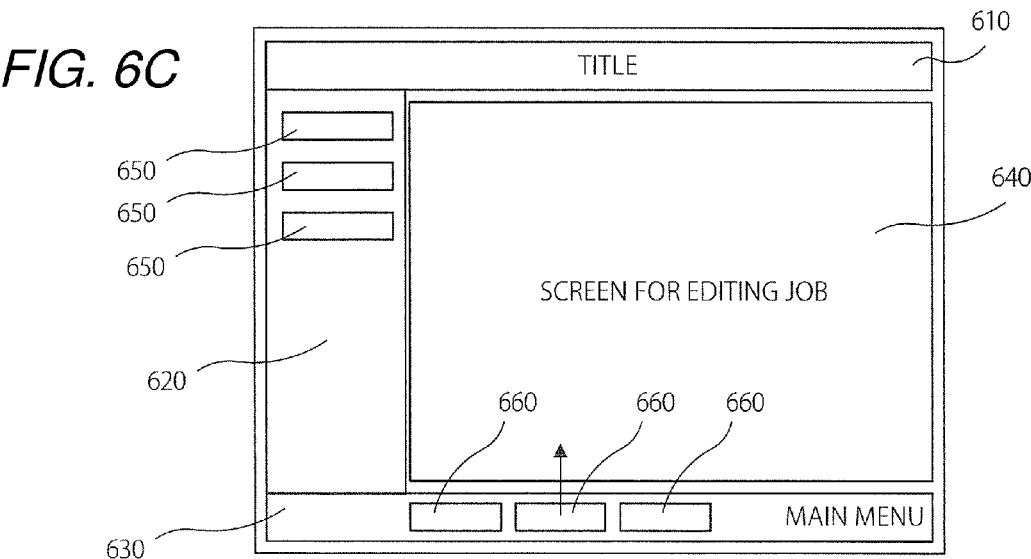
FIG. 6C is a view showing one example of the screen which is displayed on the display device by the interface-related APSW.

Here, one example of the screen will be described below which is displayed on the display device 550 by the interface-related APSW 510. FIGS. 6A, 6B and 6C are views each showing one example of a screen which is displayed on the display device 550 by the interface-related APSW 510. FIG. 6A is a view showing one example of the screen which is displayed when the task monitoring APSW 530 has been started. As is shown in FIG. 6A, the display device 550 displays a title display region 610, a submenu display region 620, a main menu display region 630 and an interface-related APSW display region 640 thereon.

A plurality of submenu buttons 650 concerning the task monitoring APSW are displayed in the submenu display region 620. In addition, a plurality of main menu buttons 660 concerning the interface-related APSW 510 are displayed in the main menu display region 630.

As is shown in FIG. 6B, when one (for instance, recipe-editing APSW 512) of the plurality of main menu buttons 660 has been clicked, for instance, a screen for editing recipes is displayed on the interface-related APSW display region 640.

In addition, as is shown in FIG. 6C, when one (for instance, APSW 514 for creating jobs for automatic conveyance) of the plurality of main menu buttons 660 has been clicked, for instance, a screen for editing jobs is displayed on the interface-related APSW display region 640.

When abnormality has occurred in any of the recipe-editing APSW 512, the APSW 514 for creating jobs for automatic conveyance, the APSW 516 for operating a single body of a unit and the parameter-editing APSW 518, the task monitoring APSW 530 restarts the software application in which the abnormality has occurred, and makes the other software applications continue the respective processes.

When the APSW 514 for creating jobs for automatic conveyance executes the edition of the jobs while the recipe-editing APSW 512 executes the edition of the recipes, for instance, suppose that abnormality has occurred in the recipe-editing APSW 512. In this case, the task monitoring APSW 530 restarts the recipe-editing APSW 512, and also makes the APSW 514 for creating jobs for automatic conveyance continue the processing. In other words, the task monitoring APSW 530 does not restart all of the software applications, but restarts only the recipe-editing APSW 512.

Thereby, the edition of the jobs by the APSW 514 for creating jobs for automatic conveyance is continued. As has been described above, in the present embodiment, the recipe-editing APSW 512, the APSW 514 for creating jobs for automatic conveyance, the APSW 516 for operating a single body of a unit and the parameter-editing APSW 518 are installed as separate software applications. Thereby, when the abnormality has occurred in any of the software applications, the processing of the software application in which the abnormality does not occur can be continued. As a result, according to the present embodiment, the plurality of functions of the CMP apparatus can be efficiently executed.

Incidentally, in the present embodiment, an example has been described in which the interface-related APSW 510 includes four software applications, but the present embodiment is not limited to the example. The interface-related APSW 510 may include at least two out of the four software applications. In this case, when abnormality has occurred in any of at least two out of the recipe-editing APSW 512, the APSW 514 for creating jobs for automatic conveyance, the APSW 516 for operating a single body of a unit and the parameter-editing APSW 518, the task monitoring APSW 530 restarts the software application in which the abnormality has occurred, and can make the other software applications continue the processing.

<Control-Related APSW>

Next, the details of the control-related APSW 520 will be described below. The control-related APSW 520 is provided with a recipe management APSW 522, a job management/control APSW 524, an APSW 526 for operating a single body of a unit, and a parameter management APSW 528.

The recipe management APSW 522 is a software application for storing the recipes which have been edited through the recipe-editing APSW 512, into a shared memory 540. The job management/control APSW 524 is a software application for storing the jobs which have been edited through the APSW 514 for creating jobs for automatic conveyance, into the shared memory 540, and also making the CMP apparatus operate on the basis of the jobs.

The APSW 526 for operating a single body of a unit is a software application for operating the unit included in the CMP apparatus on the basis of a command which has been input through the APSW 516 for operating a single body of a unit. The parameter management APSW 528 is a software application for storing the parameters which have been edited through the parameter-editing APSW 518, into the shared memory 540.

Incidentally, the software applications included in the control-related APSW 520 are not limited to the software applications shown in FIG. 5. For instance, a software application for collecting various historical data concerning the CMP apparatus and storing the collected data into the shared memory 540 can also be provided.

When abnormality has occurred in any of the recipe management APSW 522, the job management/control APSW 524, the APSW 526 for operating a single body of a unit and the parameter management APSW 528, the task monitoring APSW 530 restarts the software application in which the abnormality has occurred, and makes the other software applications continue the respective processes.

When the APSW 526 for operating a single body of a unit executes the single-body test of the unit included in the CMP apparatus while the recipe management APSW 522 executes the storage of recipes into the shared memory 540, for instance, suppose that the abnormality has occurred in recipe management APSW 522. In this case, the task monitoring APSW 530 restarts the recipe management APSW 522, and also makes the APSW 526 for operating a single body of a unit continue the processes. In other words, the task monitoring APSW 530 does not restart all of the software applications, but restarts only the recipe management APSW 522.

Thereby, the single-body test of a unit by the APSW 526 for operating a single body of a unit is continued. As has been described above, in the present embodiment, the recipe management APSW 522, the job management/control APSW 524, the APSW 526 for operating a single body of a unit and the parameter management APSW 528 are installed as separate software applications. Thereby, when the abnormality has occurred in any of the software applications, the processing of the software application in which the abnormality does not occur can be continued. As a result, according to the present embodiment, the plurality of functions of the CMP apparatus can be efficiently executed.

Incidentally, in the present embodiment, an example has been described in which the control-related APSW 520 includes four software applications, but the present embodiment is not limited to the example. The control-related APSW 520 may include at least two out of the four software applications. In this case, when abnormality has occurred in any of at least two out of the recipe management APSW 522, the job management/control APSW 524, the APSW 526 for operating a single body of a unit and the parameter management APSW 528, the task monitoring APSW 530 can restart the software application in which the abnormality has occurred, and make the other software applications continue the processing.

<Control Flow>

Figure 7:
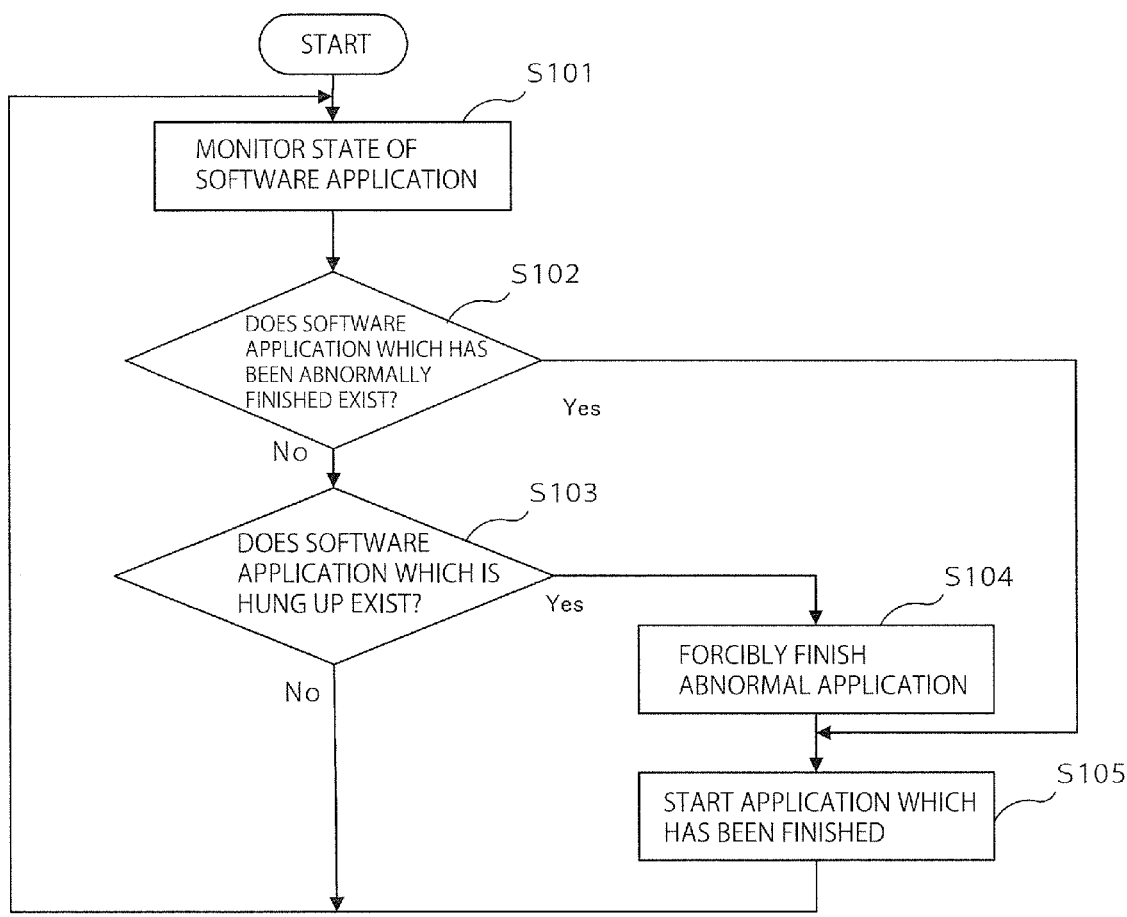
FIG. 7 is a view showing a flow of processing by the control device.

Next, a flow of processing by the control device 5 will be described below. FIG. 7 is a view showing the flow of the processing by the control device 5.

As is shown in FIG. 7, when the task monitoring APSW 530 has been started, the task monitoring APSW 530 monitors the state of a plurality of software applications which have been started (step S101). Specifically, the task monitoring APSW 530 determines whether there exists a software application which has been abnormally finished, or not (step S102).

When having determined that there exists no software application which has been abnormally finished (No, in step S102), the task monitoring APSW 530 determines whether there exists a software application which is hung up (which causes abnormality), or not (step S103).

When having determined that there exists no software application which is hung up (which causes abnormality), (No, in step S103), the task monitoring APSW 530 returns to the processing of the step S101.

On the other hand, when having determined that there exists a software application which is hung up (which causes abnormality), (Yes, in step S103), the task monitoring APSW 530 forcibly finishes the software application (abnormal software application) which is hung up (step S104).

Subsequently, the task monitoring APSW 530 starts (restarts) the software application which has been forcibly finished (step S105).

On the other hand, when having determined that there exists the software application which has been abnormally finished in the step S102 (Yes, in step S102), the task monitoring APSW 530 starts (restarts) the software application which has been abnormally finished (step S105). The task monitoring APSW 530 returns to the processing of the step S101 after the processing of the step S105.

The task monitoring APSW 530 repeats the processes of the step S101 to the step S105 until the task monitoring APSW 530 is finished.

As has been described above, in the present embodiment, the software applications are separately installed for each function of the CMP apparatus, for instance, like the interface-related APSW 510 and the control-related APSW 520. Thereby, when abnormality has occurred in any of the software applications, the processing of the software application in which abnormality does not occur can be continued. As a result, according to the present embodiment, the plurality of functions of the CMP apparatus can be efficiently executed.

Furthermore, in the present embodiment, the software applications are separately installed for each of the functions also in the interface-related APSW 510, like the recipe-editing APSW 512, the APSW 514 for creating jobs for automatic conveyance, APSW 516 for operating the single body of a unit, and the parameter-editing APSW 518. Thereby, when abnormality has occurred in any of the software applications, the processing of the software application in which abnormality does not occur can be continued. As a result, according to the present embodiment, the plurality of functions of the CMP apparatus can be efficiently executed.

In addition, in the present embodiment, the software applications are separately mounted for each of the functions also in the control-related APSW 520, like the recipe management APSW 522, the job management/control APSW 524, the APSW 526 for operating the single body of a unit, and the parameter management APSW 528. Thereby, when abnormality has occurred in any one of the software applications, the processing of the software application in which abnormality does not occur can be continued. As a result, according to the present embodiment, the plurality of functions of the CMP apparatus can be efficiently executed.

<Enhancement of Usability of User Interface>

Next, the enhancement of the usability of a user interface of the CMP apparatus will be described below.

Figure 8:
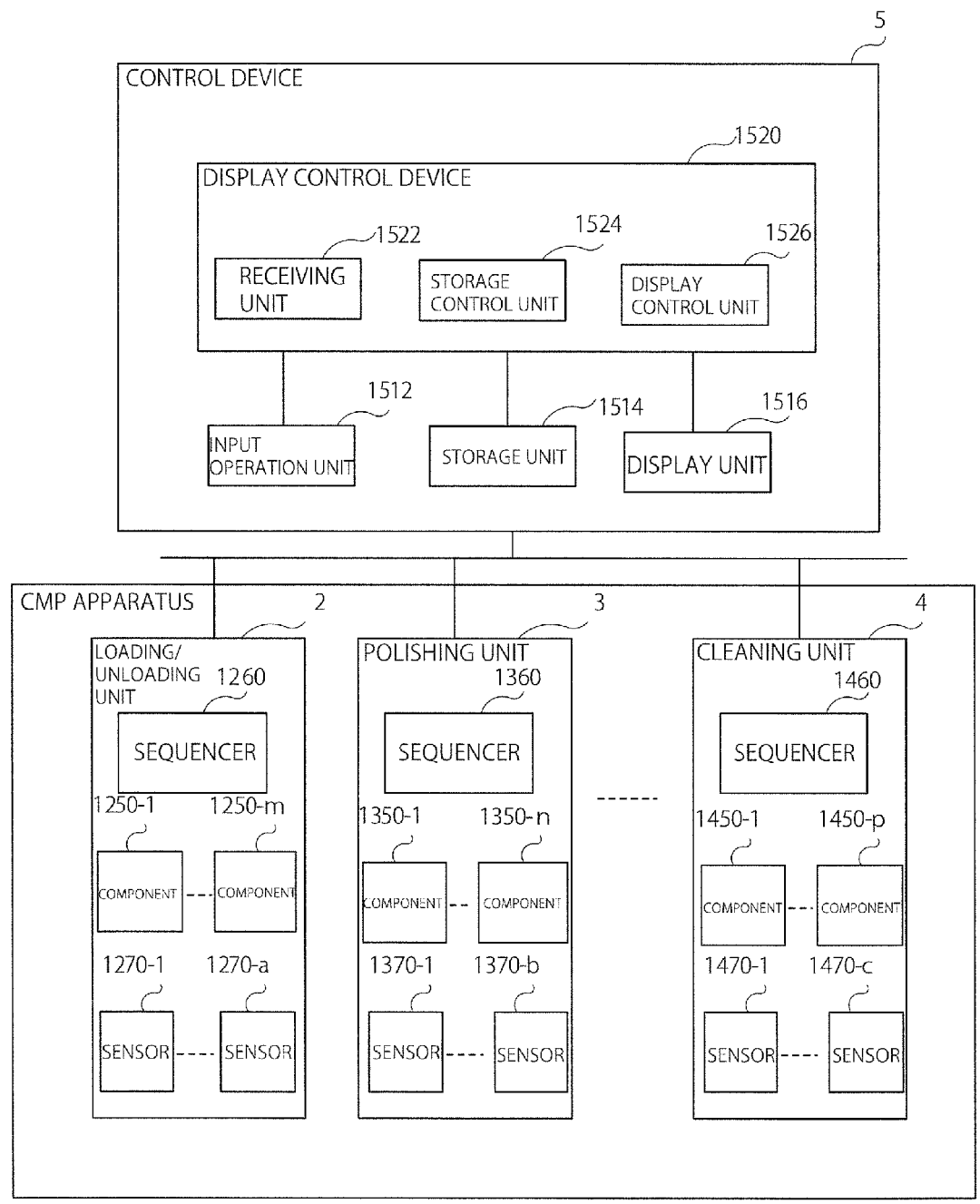
FIG. 8 is a view showing configurations of a display control device and the CMP apparatus.

FIG. 8 is a view showing configurations of the display control device and the CMP apparatus. As has been described above, the CMP apparatus includes the plurality of units such as the loading/unloading unit 2, the polishing unit 3 and the cleaning unit 4.

The loading/unloading unit 2 has a sequencer 1260 for controlling the operation of a plurality of components 1250-1 to 1250-*m* (conveying robot 22 and the like) in the loading/unloading unit 2 provided therein. In addition, the loading/unloading unit 2 has a plurality of sensors 1270-1 to 1270-*a* which detect data concerning the control of the loading/unloading unit 2 provided therein. The sensors 1270-1 to 1270-*a* include, for instance, a sensor which detects whether the wafer has been set on the conveying robot 22 or not.

The polishing unit 3 has a sequencer 1360 for controlling the operations of a plurality of components 1350-1 to 1350-*n* (polishing table, top ring and the like) in the polishing unit 3 provided therein. In addition, the polishing unit 3 has a plurality of sensors 1370-1 to 1370-*b* which detect data concerning the control of the polishing unit 3 provided therein. The sensors 1370-1 to 1370-*b* include, for instance, a sensor which detects a flow rate of a polishing liquid that is supplied to the polishing pad 10, a sensor which detects the number of revolutions of the polishing table 30, and a sensor which detects a running torque of the polishing table 30 or the top ring 31.

The cleaning unit 4 has a sequencer 1460 for controlling the operations of a plurality of components 1450-1 to 1450-*p* (cleaning module, conveying robot and the like) in the cleaning unit 4 provided therein. In addition, the cleaning unit 4 has a plurality of sensors 1470-1 to 1470-*c* which detect data concerning the control of the cleaning unit 4 provided therein. The sensors 1470-1 to 1470-*c* include, for instance, a sensor which detects a flow rate of a cleaning liquid that is supplied to the wafer.

The control device 5 is connected to the loading/unloading unit 2 (sequencer 1260), the polishing unit 3 (sequencer 1360) and the cleaning unit 4 (sequencer 1460). The control device 5 is provided with an input operation unit 1512, a storage unit 1514, a display unit 1516 and a display control device 1520.

The input operation unit 1512 is an input interface (for instance, mouse or the like) through which a user executes various operations such as the edition of the recipes concerning the CMP apparatus. The storage unit 1514 is a storage medium for storing various information such as the sizes and the arrangement positions of a plurality of images therein that are to be displayed on the display unit 1516. The display unit 1516 is a user interface through which various data are displayed and also a user performs various operations of the CMP apparatus.

The display control device 1520 is provided with a receiving unit 1522, a storage control unit 1524 and a display control unit 1526.

The receiving unit 1522 receives a start-up command of the software concerning the operation of the CMP apparatus. For instance, when the user has performed an operation of starting the software through the input operation unit 1512, the receiving unit 1522 receives the start-up command which has been generated by this start-up operation.

The display control unit 1526 reads out images from the storage unit 1514, which correspond to the start-up command that has been received by the receiving unit 1522, and makes the display unit 5116 display the read out images. Specifically, the image which is displayed on the display unit 1516 includes a plurality of images of different functions (for instance, monitoring-related image and operation-related image). In this case, the display control unit 1526 reads out the sizes and the arrangement positions of the images for each of the plurality of images, from the storage unit 1514, and makes the display unit 1516 display each of the images on the basis of the size and arrangement position of each of the read out images. Incidentally, in the present embodiment, an example will be shown below in which the sizes or positions of the images concerning the monitoring-related image and the operation-related image are adjusted, but the present invention is not limited to the example.

In addition, the display control unit 1526 can adjust the sizes or arrangement positions of the plurality of images which have been displayed on the display unit 1516, on the basis of an adjustment instruction that has been input through the input operation unit 1512. When the input operation unit 1512 is a mouse, for instance, after the user has performed an operation of expanding the sizes of the images which have been displayed on the display unit 1516, by a Drag & Drop operation of the mouse, the display control unit 1526 makes the display unit 1516 display the images in the state of having made the sizes of the images expanded according to an expansion instruction that has been input through the mouse. In addition, for instance, when the user has performed an operation of changing the arrangement positions of the images which have been displayed on the display unit 1516, by the Drag & Drop operation of the mouse, the display control unit 1526 changes coordinates of the images according to a change instruction which has been input through the mouse, and makes the display unit 1516 display the images on the basis of the changed coordinates.

The storage control unit 1524 can make the storage unit 1514 store the sizes and the arrangement positions of the plurality of images which have been displayed on the display unit 1516, while making the sizes and the arrangement positions correspond to the type of the start-up command which has made the display unit 1516 display the plurality of images. Specifically, it needs a labor to adjust the plurality of images to the optimum sizes and arrangement positions, every time when a user starts the software application, and accordingly when the sizes and the arrangement positions have been adjusted once, the storage control unit 1524 can make the storage unit 1514 store the state.

In this case, when the receiving unit 1522 has received the start-up command, the display control unit 1526 reads out the sizes and the arrangement positions of the plurality of images from the storage unit, which correspond to the type of the start-up command that has been received by the receiving unit 1522. The display control unit 1526 makes the display unit 1516 display the plurality of images, on the basis of the read out sizes and arrangement positions of the plurality of images. Thereby, when the user has started the software application, the plurality of images are displayed in the state of the optimum size and arrangement position which have been stored with regard to the software application. Accordingly, it is unnecessary to adjust the sizes and arrangement positions of the plurality of images again, and the usability is excellent.

In addition, the storage control unit 1524 can make the storage unit 1514 store the sizes and arrangement positions of the plurality of images which have been displayed on the display unit 1516, while making the sizes and arrangement positions correspond to the type of the start-up command that has made the display unit 1516 display the plurality of images, and to an identifier that has been input through the input operation unit 1512. In other words, there is the case where the optimum size and arrangement position of the plurality of images are different depending on each user. Then, by making the storage unit 1514 store the sizes and arrangement positions of the plurality of images while making the sizes and arrangement positions correspond to the identifier (for instance, user name or the like) which the user has input, the storage control unit 1524 can make the storage unit 1514 store the optimum size and arrangement position of the images for each of the individual users.

In this case, when the receiving unit 1522 has received the start-up command, the display control unit 1526 reads out the sizes and the arrangement positions of the plurality of images from the storage unit 1514, which correspond to the type of the start-up command that has been received by the receiving unit 1522 and the identifier that has been input through the input operation unit 1512. Then, the display control unit 1526 can make the display unit 1516 display a plurality of images, on the basis of the read out sizes and arrangement positions of the plurality of images. Thereby, if the user has input the identifier (for instance, user name or the like) when starting the software application, the plurality of images are displayed in the state of the size and arrangement position which have been stored according to the identifier, and accordingly it is unnecessary to adjust again the optimum size and arrangement state of the images, which is specific to the user. Thus, the usability is excellent.

<Example of Adjustment of Image>

Figure 9:
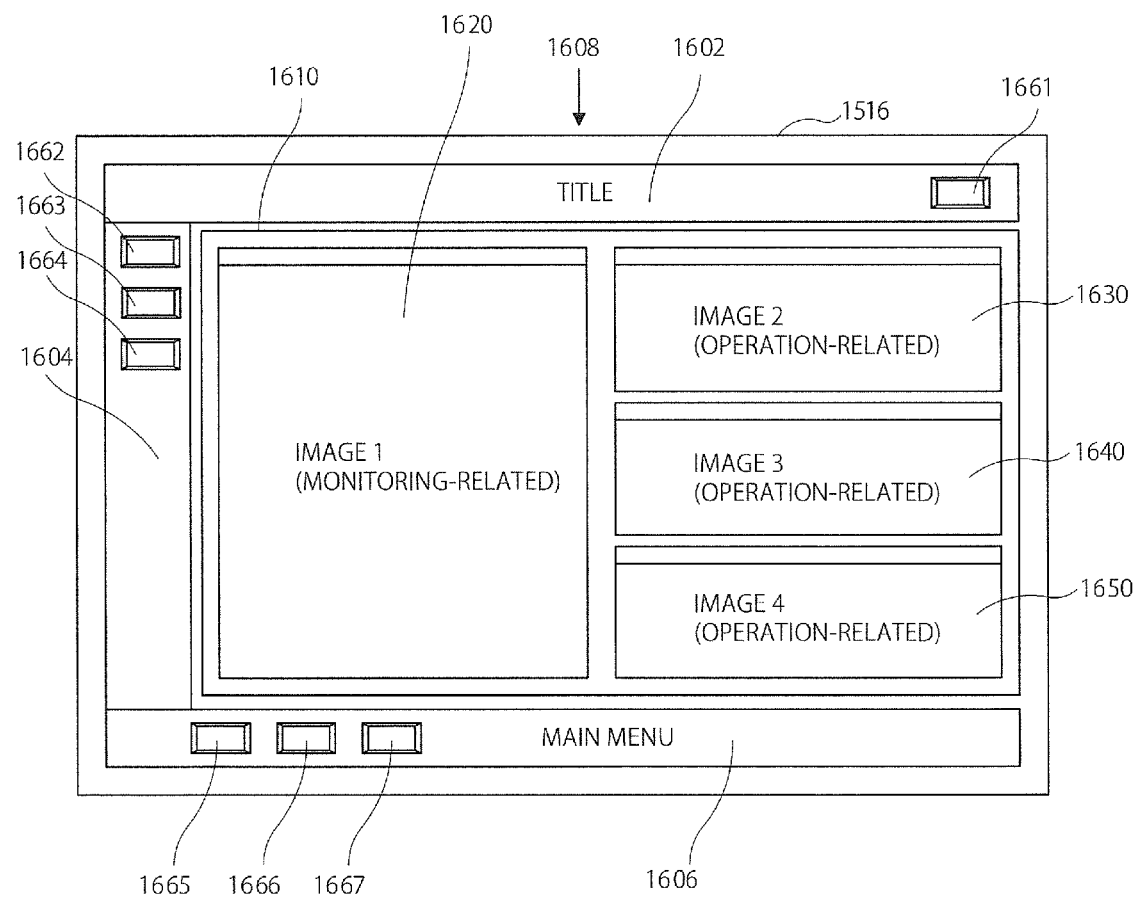
FIG. 9 is a view showing one example of an image display shown by a conventional technology.
Figure 10:
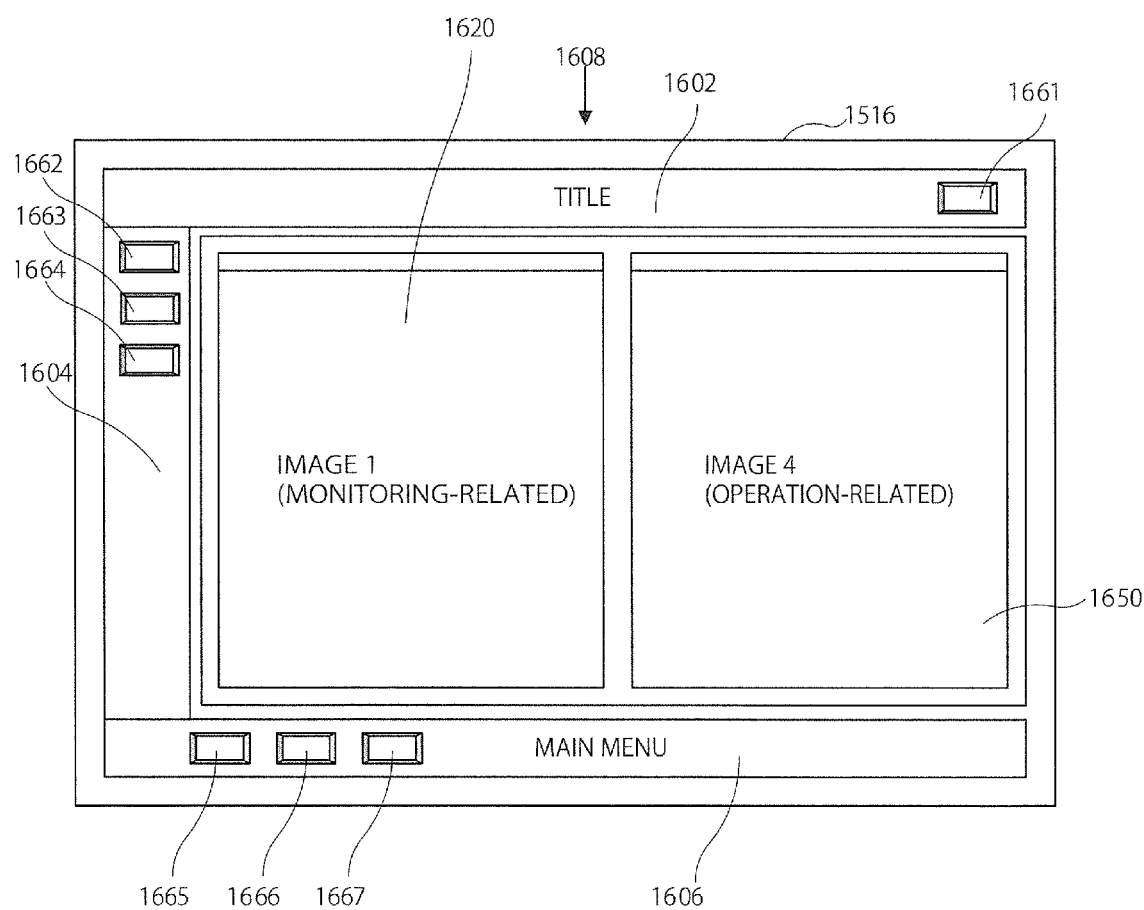
FIG. 10 is a view showing one example of an image display which has been adjusted by the present embodiment.
Figure 11:
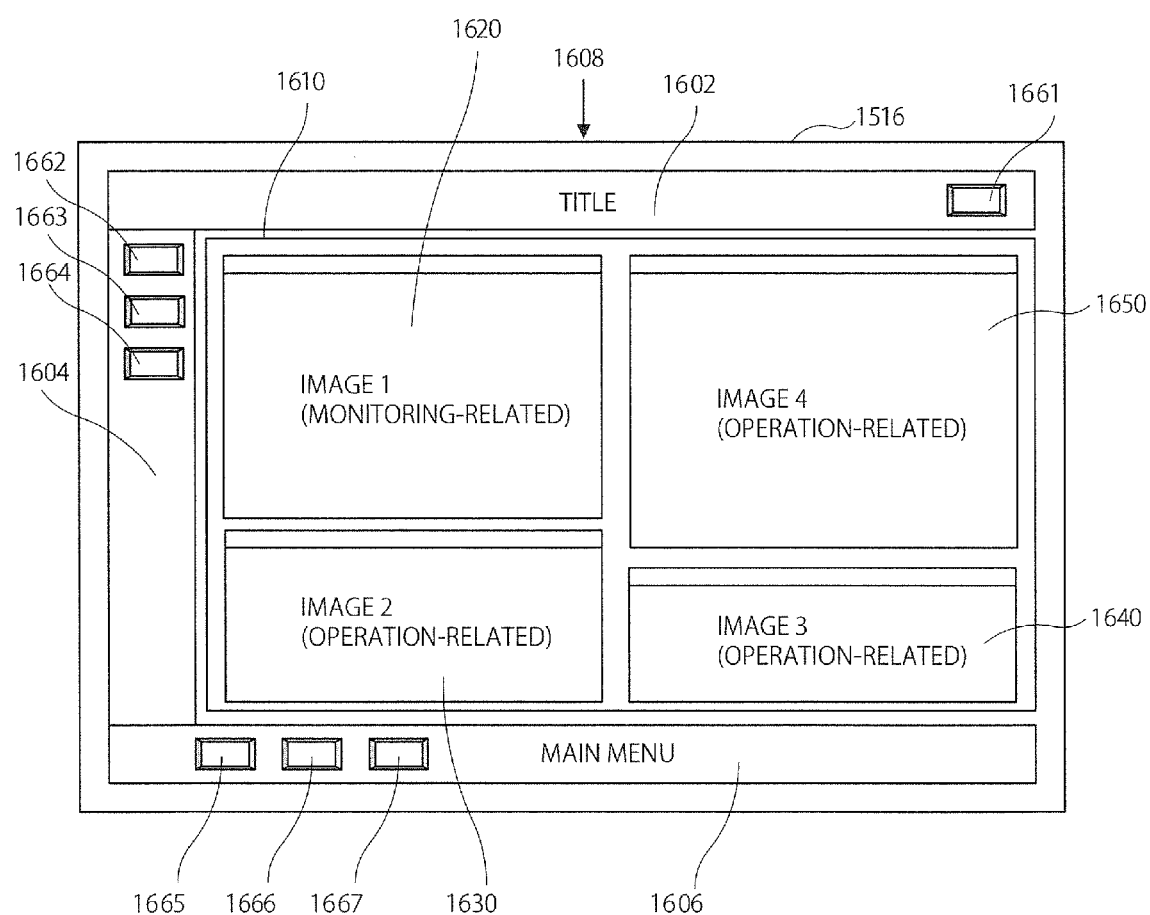
FIG. 11 is a view showing one example of the image display which has been adjusted by the present embodiment.

Adjustment of a plurality of images by the display control unit 1526 will be described below with reference to the drawings. FIG. 9 is a view showing one example of an image display according to a conventional technology. FIG. 10 to FIG. 11 are views showing one example of an image display which has been adjusted by the present embodiment.

As is shown in FIG. 9, in a conventional technology, a title display image 1602 is displayed on the upper part of the screen of the display unit 1516, an operation menu image 1604 is displayed on the left part thereof, and a main menu image 1606 is displayed on the lower part thereof. The title display image 1602, the operation menu image 1604 and the main menu image 1606 constitute a base image 1608 which is used in common regardless of the type of the software that is executed for the CMP apparatus. The title display image 1602 has a button 1661 for operation for performing various operations concerning the CMP apparatus provided therein. The operation menu image 1604 has buttons 1662, 1663 and 1664 for operation for performing various operations concerning the CMP apparatus provided therein. The main menu image 1606 has buttons 1665, 1666 and 1667 for operation for performing various operations concerning the CMP apparatus provided therein.

In a region 1610 which excludes the title display image 1602, the operation menu image 1604 and the main menu image 1606 from the screens on the display unit 1516, a monitoring-related image 1620 and operation-related images 1630, 1640 and 1650 are displayed.

Specifically, the monitoring-related image 1620 is displayed on a left-side half region of the region 1610, as an image 1. The monitoring-related image 1620 is, for instance, an image for a user to monitor an operation state of the CMP apparatus. In addition, the operation-related images 1630, 1640 and 1650 are displayed on a right-side half region of the region 1610 as an image 2, an image 3 and an image 4, respectively. The operation-related image 1630 is, for instance, an image for a user to perform an operation concerning the substrate. In addition, the operation-related image 1640 is an image for a user to perform an operation concerning a carrier of the substrate. In addition, the operation-related image 1650 is an image for a user to perform an operation concerning a job.

In the CMP apparatus, there are various operation states such as an execution of a process in each unit, an automatic conveyance test for the substrate, an assembly of the substrate treatment apparatus and the like, and software applications are installed for each of the operations. On the other hand, in the conventional technology, even when any one of the software applications has been executed, the monitoring-related image 1620 has been displayed in the left-side half region of the region 1610, and the operation-related images 1630, 1640 and 1650 have been displayed in the right-side half region of the region 1610, as are shown in FIG. 9.

On the other hand, in the present embodiment, the display control unit 1526 can adjust the sizes or arrangement positions of the plurality of images which are displayed on the display unit 1516. For instance, a state shall be considered in which the user performs mainly an operation concerning the job while monitoring the operation state of the CMP apparatus (does not perform operation concerning substrate or operation concerning carrier of substrate). In this case, the display control unit 1526 can expand the operation-related image 1650 of the image 4 to the whole right-side half region of the region 1610, on the basis of the adjustment instruction by the user, as is shown in FIG. 10.

On the other hand, a state shall be considered in which the user monitors the operation state of the CMP apparatus, but the importance is not so high, and the user performs mainly the operation concerning the substrate, the operation concerning the carrier of the substrate, and the operation concerning the job. In this case, the display control unit 1526 can reduce the size of the monitoring-related image 1620 of the image 1 and also change the arrangement position of the operation-related image 1630 to an unoccupied left-side half region of the region 1610, on the basis of the adjustment instruction by the user, as is shown in FIG. 11. In addition, the display control unit 1526 can expand the operation-related image 1650 in the right-side half region of the region 1610, move the arrangement position upward, and move the arrangement position of the operation-related image 1640 to a lower region which has become empty due to the movement of the operation-related image 1650, on the basis of the adjustment instruction by the user.

As has been described above, according to the present embodiment, a user can adjust the optimum size and arrangement position of the image while matching the size and arrangement position to the type (operation states) of the software application which is executed by the CMP apparatus, and accordingly the usability concerning the user interface of the CMP apparatus can be enhanced.

Incidentally, as is shown in FIG. 9 to FIG. 11, the base image 1608 which is used in common regardless of the type of start-up command of the software application is included in the plurality of images that are displayed on the display unit 1516. The display control unit 1526 can make the display unit 1516 display the base image 1608 with a fixed size and at a fixed arrangement position, regardless of the type of the start-up command which has been received by the receiving unit 1522. The reason is because the base image 1608 is an image for performing the operation of the CMP apparatus and the like regardless of the type of software application, and accordingly there is the case where the usability of the user interface is rather excellent when the size and the arrangement position are not changed but fixed.

<Specific Example of Adjustment of Image>

Figure 12:
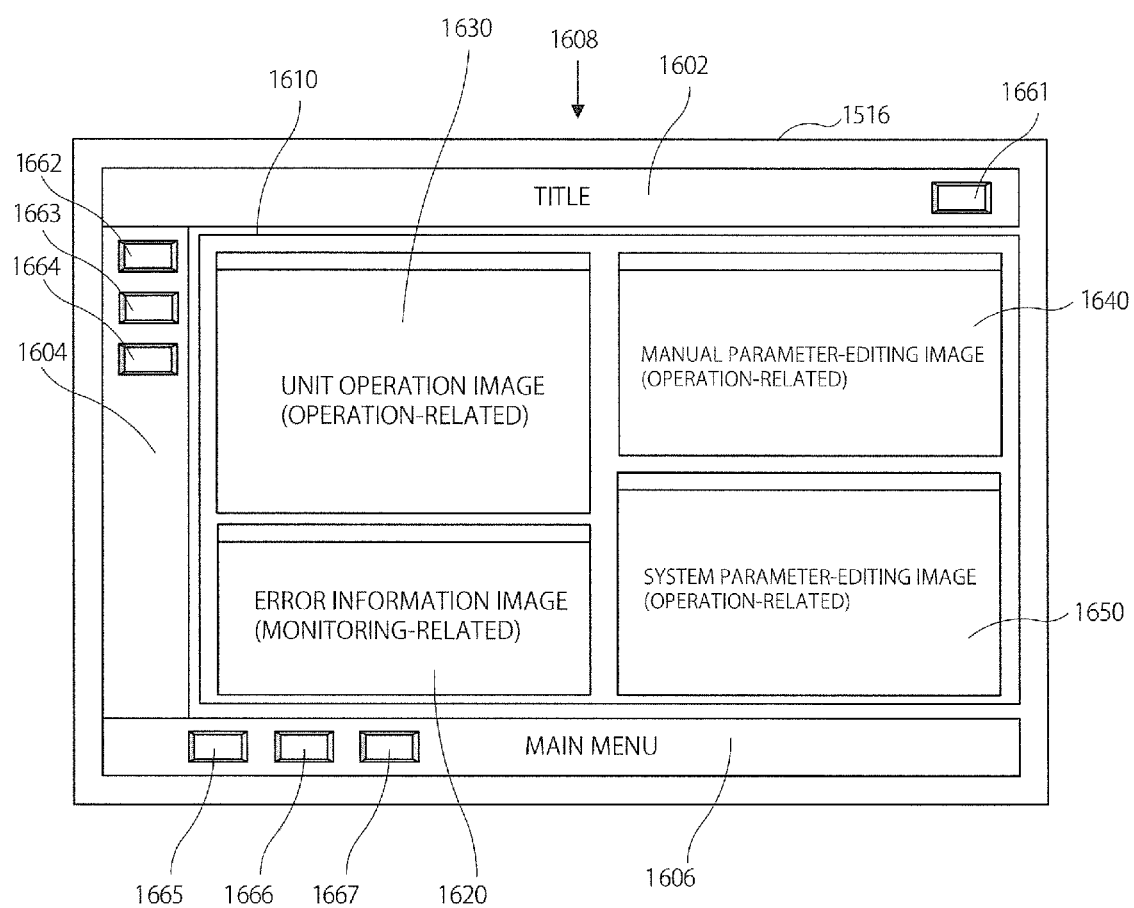
FIG. 12 is a view showing one example of the image display shown when an assembly and adjustment of the CMP apparatus is executed.

Next, a specific example of the size and the arrangement position of the image according to the type (operation state) of the software which is executed by the CMP apparatus will be described below. FIG. 12 is a view showing one example of an image display shown when an assembly and adjustment of the CMP apparatus is executed.

When the assembly and adjustment of the CMP apparatus is executed, error information concerning the assembly and adjustment is monitored and also a plurality of operations are performed; but the importance of the monitoring is not so high, and the importance of the operation-related image is high as compared with the importance of the monitoring, because the plurality of operations are performed.

For this reason, the display control unit 1526 can adjust the size of the monitoring-related image 1620 which displays the error information, and arrange the adjusted image to the left-side lower part of the region 1610, on the basis of the adjustment instruction of the user, as is shown in FIG. 12. In addition, the display control unit 1526 can adjust the size of the operation-related image 1630 for operating each of the units, and arrange the adjusted image to the left-side upper part of the region 1610, on the basis of the adjustment instruction of the user. In addition, the display control unit 1526 can adjust the size of the operation-related image 1640 for editing a manual parameter concerning the assembly and adjustment, and arrange the adjusted image to the right-side upper part of the region 1610, on the basis of the adjustment instruction of the user. In addition, the display control unit 1526 can adjust the size of the operation-related image 1650 for editing a system parameter concerning the assembly and adjustment, and arrange the adjusted image to the right-side upper part of the region 1610, on the basis of the adjustment instruction of the user.

Figure 13:
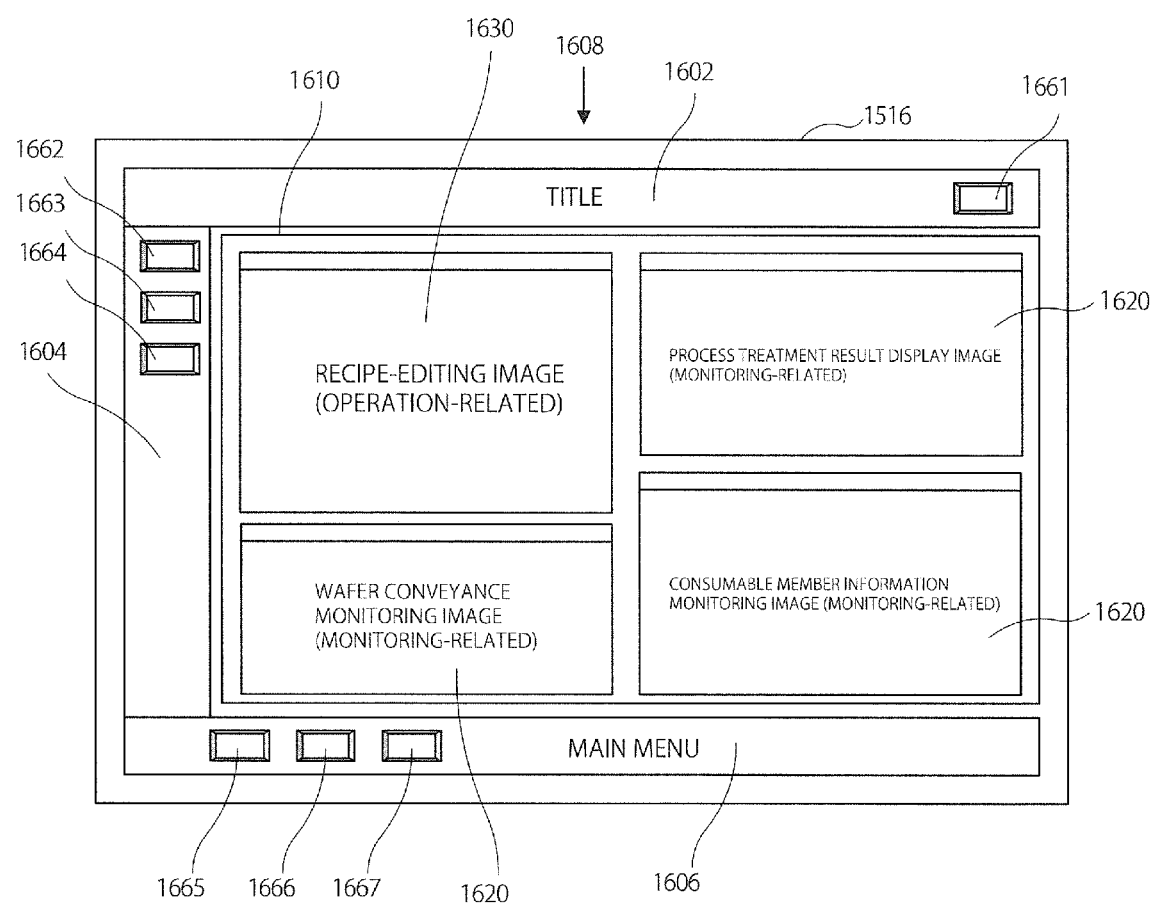
FIG. 13 is a view showing one example of an image display shown when the process treatment in a unit of the CMP apparatus is executed.

Next, FIG. 13 is a view showing one example of an image display shown when the process treatment in a unit of the CMP apparatus is executed. When the process treatment is executed, various information concerning the process treatment is monitored while the recipe is edited, but the importance of the edition of the recipe is not so high, and the importance of the monitoring of various information concerning the process treatment is high as compared with the importance of the edition.

For this reason, the display control unit 1526 can adjust the size of the operation-related image 1630 for editing the recipe, and arrange the adjusted image to the left-side upper part of the region 1610, on the basis of the adjustment instruction of the user, as is shown in FIG. 13. In addition, the display control unit 1526 can adjust the size of the monitoring-related image 1620 for monitoring the conveying state of the substrate, and arrange the adjusted image to the left-side lower part of the region 1610, on the basis of the adjustment instruction of the user. In addition, the display control unit 1526 can adjust the size of the monitoring-related image 1620 for monitoring the result of the process treatment, and can arrange the adjusted image to the right-side upper part of the region 1610, on the basis of the adjustment instruction of the user. In addition, the display control unit 1526 can adjust the size of the monitoring-related image 1620 for monitoring the state of a consumable member, and arrange the adjusted image to the right-side lower part of the region 1610, on the basis of the adjustment instruction of the user.

Figure 14:
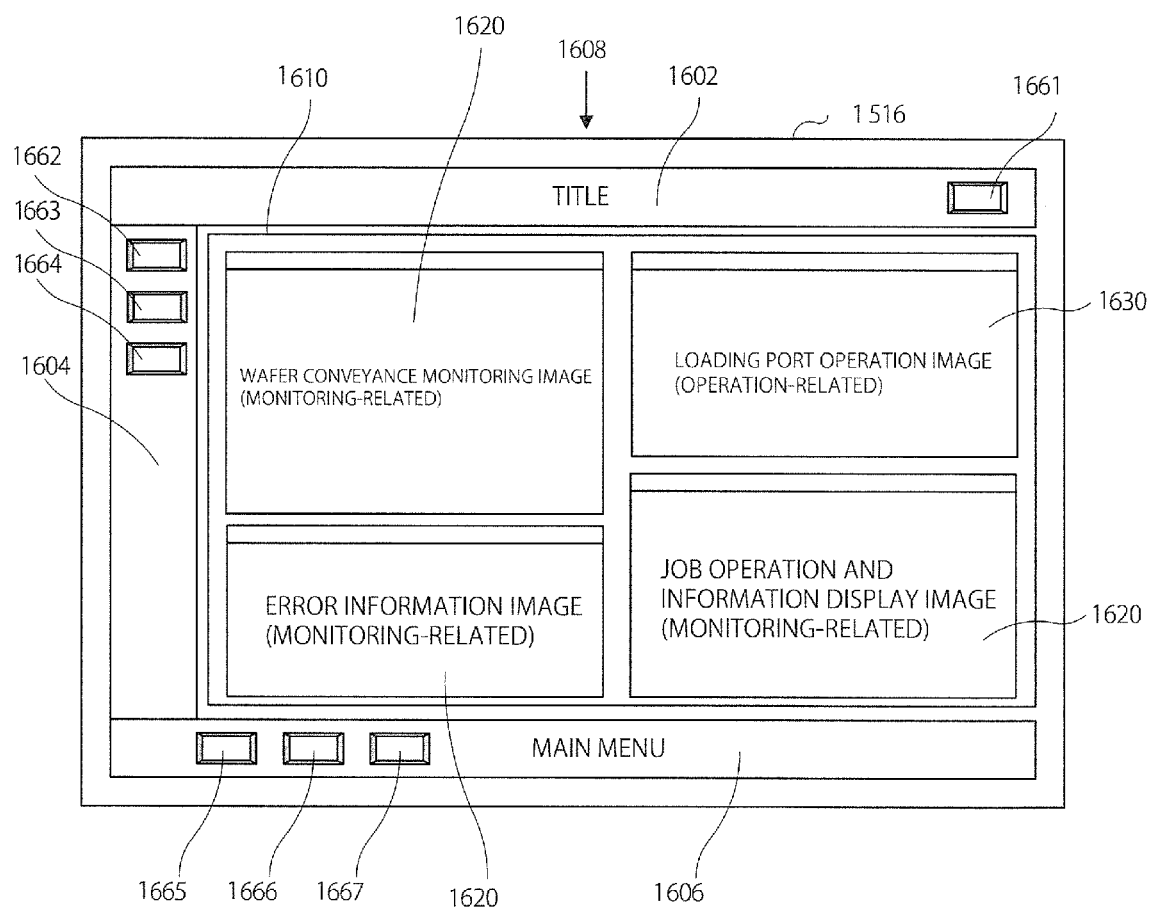
FIG. 14 is a view showing one example of an image display shown when an automatic conveyance test of a substrate is executed in the CMP apparatus.

Next, FIG. 14 is a view showing one example of an image display shown when an automatic conveyance test of a substrate is executed in the CMP apparatus. When the automatic conveyance test of the substrate is executed, a loading port is operated and also various information concerning the automatic conveyance of the substrate is monitored, but the importance of the operation of the loading port is not so high, and the importance of the monitoring of various information concerning the automatic conveyance of the substrate is high as compared with the importance of the operation of the loading port.

For this reason, the display control unit 1526 can adjust the size of the monitoring-related image 1620 for monitoring a conveyance situation of the substrate, and arrange the adjusted image to the left-side upper part of the region 1610, on the basis of the adjustment instruction of the user, as is shown in FIG. 14. In addition, the display control unit 1526 can adjust the size of the monitoring-related image 1620 for monitoring error information concerning the automatic conveyance of the substrate, and arrange the adjusted image to the left-side lower part of the region 1610, on the basis of the adjustment instruction of the user. In addition, the display control unit 1526 can adjust the size of the operation-related image 1630 for operating the loading port, and arrange the adjusted image to the right-side upper part of the region 1610, on the basis of the adjustment instruction of the user. In addition, the display control unit 1526 can adjust the size of the monitoring-related image 1620 for monitoring information concerning a job operation of the automatic conveyance of the substrate, and arrange the adjusted image to the right-side lower part of the region 1610, on the basis of the adjustment instruction of the user.

Figure 15:
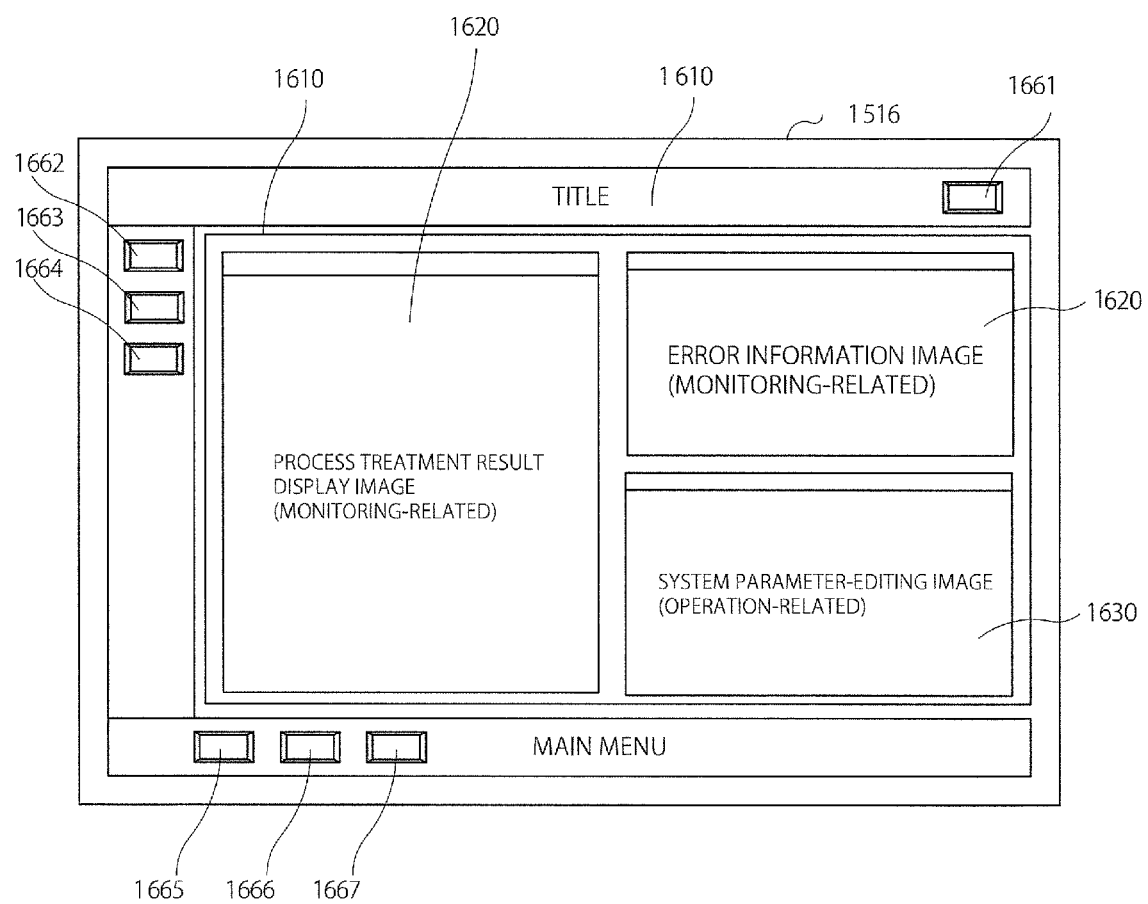
FIG. 15 is a view showing one example of the image display shown when a trouble has occurred during the process treatment in the CMP apparatus.

Next, FIG. 15 is a view showing one example of the image display shown when a trouble has occurred during the process treatment in the CMP apparatus. When the trouble has occurred during the process treatment, the system parameter is edited and also the result of the process treatment and the error information are monitored, but the importance of the operation of editing the system parameter is not so high, and the importance of the monitoring of the process treatment and the error information is high as compared with the importance of the operation of editing the system parameter.

For this reason, the display control unit 1526 can adjust the size of the monitoring-related image 1620 for monitoring the result of the process treatment, and arrange the adjusted image to the left side of the region 1610, on the basis of the adjustment instruction of the user, as is shown in FIG. 15. In addition, the display control unit 1526 can adjust the size of the monitoring-related image 1620 for monitoring the error information, and arrange the adjusted image to the right-side upper part of the region 1610, on the basis of the adjustment instruction of the user. In addition, the display control unit 1526 can adjust the size of the operation-related image 1630 for operating the system parameter, and arrange the adjusted image to the right-side lower part of the region 1610, on the basis of the adjustment instruction of the user.

<Flow Chart>

Figure 16:
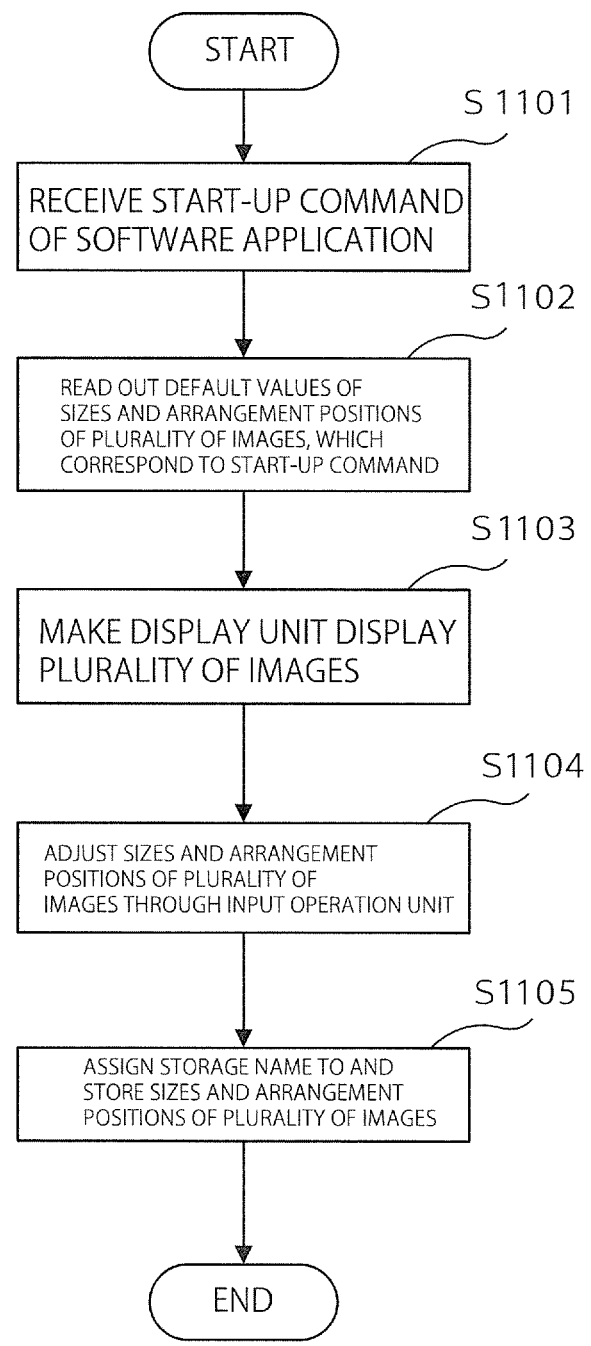
FIG. 16 is a flow chart of a processing which is executed by the display control device.
Figure 17:
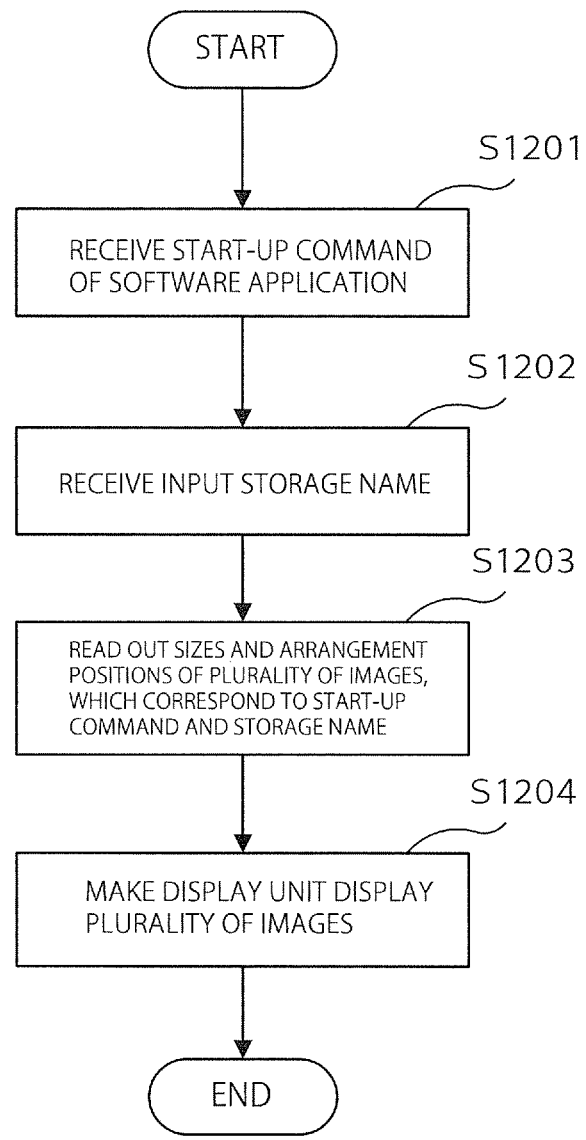
FIG. 17 is a flow chart of a processing which is executed by the display control device.

Next, a process which is executed by the display control device 1520 will be described below. FIG. 16 and FIG. 17 are flow charts of the processes which are executed by the display control device 1520. FIG. 16 and FIG. 17 are examples in which the plurality of images are adjusted, and also an identifier which is specific to the user is used in order that the optimum image arrangement for each of the users is reproduced with excellent usability. FIG. 16 assumes the case where the plurality of images are not yet adjusted, and default values of the sizes and the arrangement positions of the plurality of images are stored in the storage unit 1514.

As is shown in FIG. 16, firstly, the receiving unit 1522 receives the start-up command of a software application (step S1101). The start-up command of the software application is generated, for instance, by an operation of starting the software application, which is performed by the user through the input operation unit 1512.

Subsequently, the display control unit 1526 reads out the default values of the sizes and the arrangement positions of the plurality of images from the storage unit 1514, which correspond to the start-up command that has been received by the receiving unit 1522 (step S1102). Subsequently, the display control unit 1526 makes the display unit 1516 display the plurality of images, on the basis of the default values of the sizes and the arrangement positions of the read out images (step S1103).

Subsequently, the display control unit 1526 adjusts the sizes and the arrangement positions of the plurality of images, on the basis of the adjustment instruction of the user, which has been input through the input operation unit 1512 (step S1104).

Subsequently, when a storage instruction and a storage name of the images have been input through the input operation unit 1512, the storage control unit 1524 assigns the input storage name and stores the sizes and the arrangement positions of the plurality of images into the storage unit 1514 (step S1105).

By the above described processing, the sizes and the arrangement positions of the plurality of images are adjusted, and also the state is associated with the storage name and is stored in the storage unit 1514.

Next, FIG. 17 assumes the case in which the software application has been started in the state in which the plurality of images have been adjusted, and the sizes and the arrangement positions of the adjusted images have been stored in the storage unit 1514.

As is shown in FIG. 17, firstly, the receiving unit 1522 receives the start-up command of a software application (step S1201). The start-up command of the software application is generated by an operation of starting the software application, which is performed by the user through the input operation unit 1512, for instance.

Subsequently, the input operation unit 1512 receives the storage name input by the user (step S1202). Subsequently, the display control unit 1526 reads out the sizes and the arrangement positions of the plurality of images from the storage unit 1514, which correspond to the start-up command that has been received by the receiving unit 1522 and the storage name that has been received by the input operation unit 1512 (step S1203).

Subsequently, the display control unit 1526 makes the display unit 1516 display the plurality of images, on the basis of the sizes and arrangement positions of the read out images (step S1204).

According to the above processing, if the user has input the identifier (for instance, user name or the like) when starting the software application, the plurality of images are displayed in the state of the size and arrangement position which have been stored according to the identifier, and accordingly it is unnecessary to adjust again the optimum size and arrangement state of the images, which is specific to the user. Thus, the usability is excellent.

Figure 18:
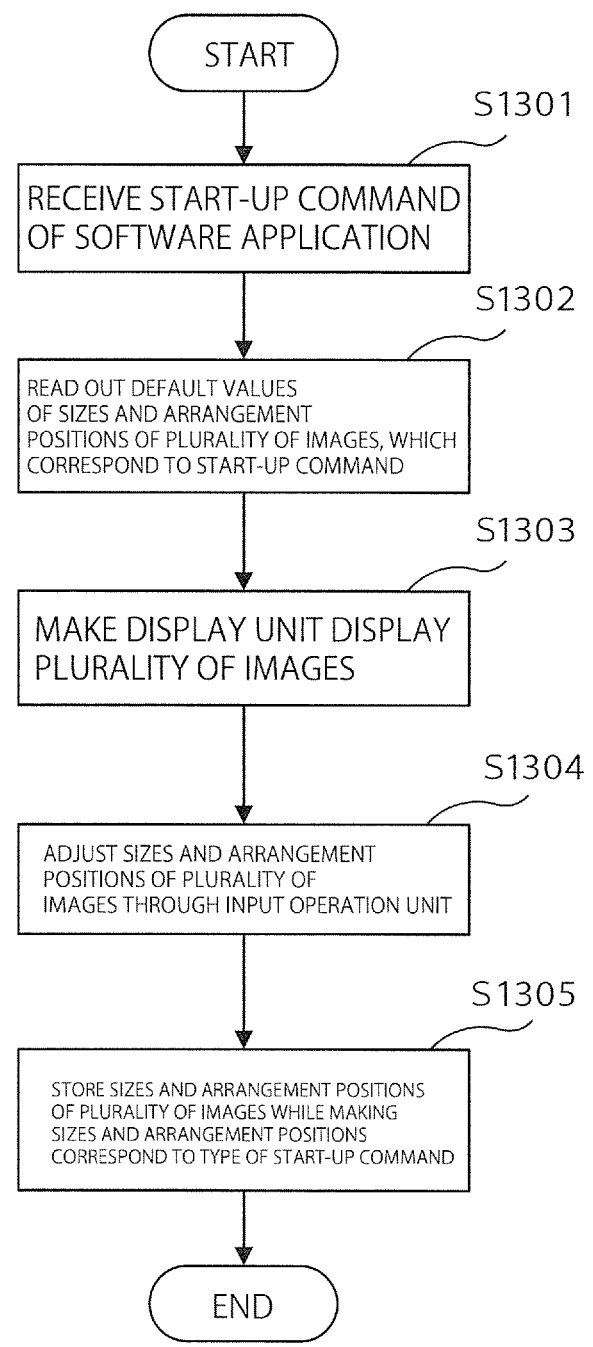
FIG. 18 is a flow chart of a processing which is executed by the display control device.
Figure 19:
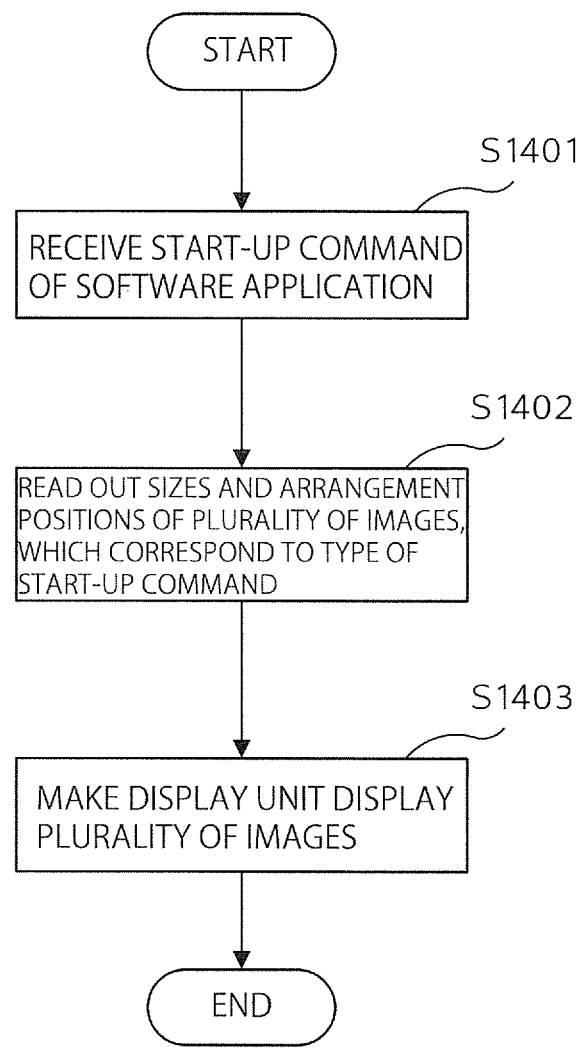
FIG. 19 is a flow chart of a processing which is executed by the display control device.

Next, another example of a process which is executed by the display control device 1520 will be described below. FIG. 18 and FIG. 19 are flow charts of the processes which are executed by the display control device 1520. FIG. 18 and FIG. 19 are examples in which the plurality of images are adjusted, and also the optimum image arrangement for each of the applications is reproduced with excellent usability. FIG. 18 assumes the case in which the plurality of images are not yet adjusted, and the default values of the sizes and the arrangement positions of the plurality of images are stored in the storage unit 1514.

As is shown in FIG. 18, firstly, the receiving unit 1522 receives the start-up command of a software application (step S1301). The start-up command of the software application is generated, for instance, by an operation of starting the software application, which is performed by the user through the input operation unit 1512.

Subsequently, the display control unit 1526 reads out the default values of the sizes and the arrangement positions of the plurality of images from the storage unit 1514, which correspond to the start-up command that has been received by the receiving unit 1522 (step S1302). Subsequently, the display control unit 1526 makes the display unit 1516 display the plurality of images, on the basis of the default values of the sizes and the arrangement positions of the read out images (step S1303).

Subsequently, the display control unit 1526 adjusts the sizes and the arrangement positions of the plurality of images, on the basis of the adjustment instruction of the user, which has been input through the input operation unit 1512 (step S1304).

Subsequently, when a storage instruction of the images has been input through the input operation unit 1512, the storage control unit 1524 stores the sizes and the arrangement positions of the plurality of images into the storage unit 1514, while making the sizes and the arrangement positions correspond to the type of the software application (start-up command) that is currently started (step S1305).

By the above described processing, the sizes and the arrangement positions of the plurality of images are adjusted, and also the state is associated with the type of software application (start-up command) and is stored in the storage unit 1514.

Next, FIG. 19 assumes the case in which the software application has been started in the state in which the plurality of images have been adjusted, and the sizes and the arrangement positions of the adjusted images have been stored in the storage unit 1514.

As is shown in FIG. 19, firstly, the receiving unit 1522 receives the start-up command of a software application (step S1401). The start-up command of the software application is generated, for instance, by an operation of starting the software application, which is performed by the user through the input operation unit 1512.

Subsequently, the display control unit 1526 reads out the sizes and the arrangement positions of the plurality of images from the storage unit 1514, which correspond to the type of the start-up command that has been received by the receiving unit 1522 (step S1402).

Subsequently, the display control unit 1526 makes the display unit 1516 display the plurality of images, on the basis of the sizes and arrangement positions of the read out images (step S1403).

According to the above processing, when the user has started the software application, the plurality of images are displayed in the state of the optimum size and arrangement position which have been stored with regard to the software application. Accordingly, it is unnecessary to adjust the sizes and arrangement positions of the plurality of images again, and the usability is excellent.

<Efficient Execution of Plurality of Jobs Concerning Test Conveyance of Substrate>

Next, an efficient execution of a plurality of jobs concerning a test conveyance of a substrate will be described below.

Figure 20:
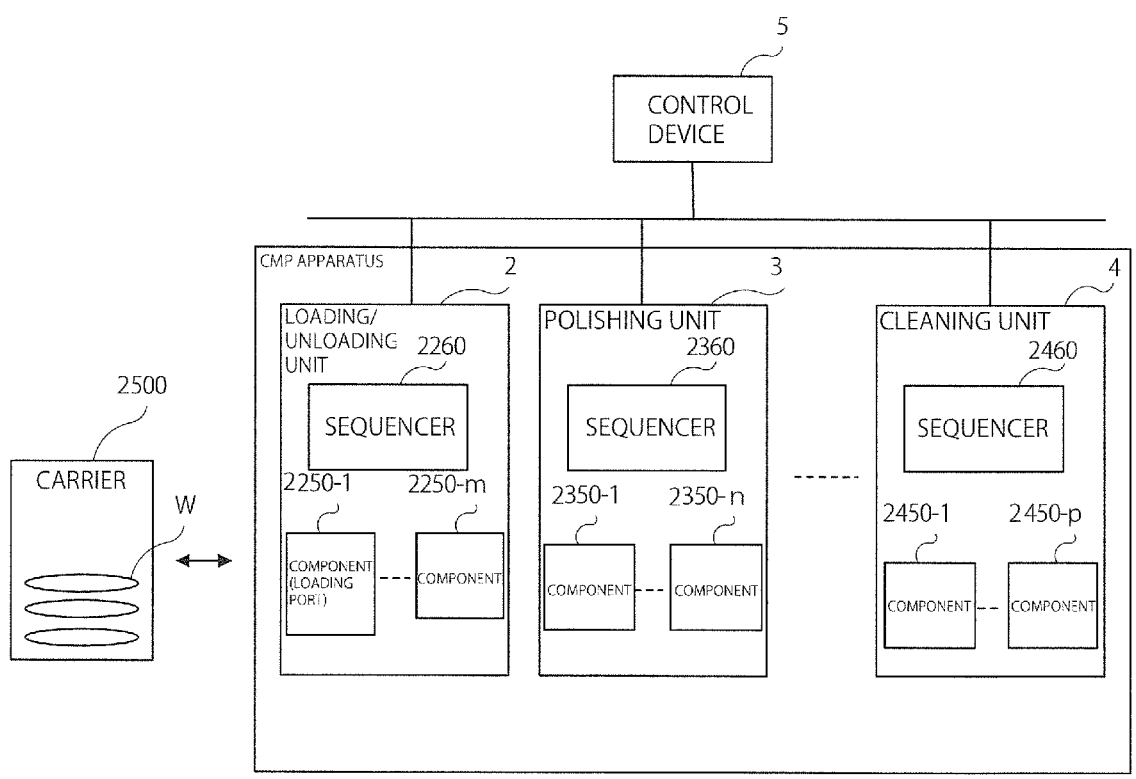
FIG. 20 is a view showing configurations of the CMP apparatus and the control device (PC for operation)

FIG. 20 is a view showing configurations of the CMP apparatus and the control device (PC for operation). As has been described above, the CMP apparatus includes a plurality of units such as the loading/unloading unit 2, the polishing unit 3 and the cleaning unit 4. The loading/unloading unit 2 has a sequencer 2260 for controlling the operations of a plurality of components 2250-1 to 2250-*m* (conveying robot 22 and the like) in the loading/unloading unit 2 provided therein. The plurality of components 2250-1 to 2250-*m* include, for instance, a loading port which functions as an interface for supplying a wafer to the CMP apparatus.

In addition, the polishing unit 3 has a sequencer 2360 for controlling the operations of a plurality of components 2350-1 to 2350-*n* (polishing table, top ring and the like) in the polishing unit 3 provided therein. In addition, the cleaning unit 4 has a sequencer 2460 for controlling the operations of a plurality of components 2450-1 to 2450-*p* (cleaning module, conveying robot and the like) in the cleaning unit 4 provided therein.

The control device 5 is connected to the loading/unloading unit 2 (sequencer 2260), the polishing unit 3 (sequencer 2360) and the cleaning unit 4 (sequencer 2460). The control device 5 performs control concerning the test conveyance of the wafer.

As is shown in FIG. 20, in the state shown before the test conveyance of the wafer is started, for instance, a carrier 2500 is provided at a predetermined place which is distant from the CMP apparatus, and accommodates wafers W for test conveyance therein. The carrier 2500 can accommodate one wafer or a plurality of wafers therein. The CMP apparatus includes the carrier 2500, the treatment chambers of the polishing unit 3, the cleaning unit 4 and the like, and the control device 5. Incidentally, the carrier 2500 approaches the treatment chamber (polishing unit 3 or cleaning unit 4) of the wafer by the loading treatment, and moves away from the treatment chamber by the unloading treatment, in the process of the conveyance test of the wafer.

The control device 5 continuously executes a plurality of jobs concerning the test conveyance in the treatment chamber (polishing unit 3 or cleaning unit 4) of the wafer. Incidentally, the job specifies, for instance, various parameters (for instance, conveyance path, conveyance speed or the like) for subjecting the wafer to the test conveyance in the treatment chamber, and arbitrary jobs can be created, for instance, by appropriately combining recipes which have been previously set for the CMP apparatus, to each other. In addition, the plurality of created jobs can be stored, for instance, in the storage device and the like which are provided in the control device 5.

In the present embodiment, the control device 5 continuously executes the plurality of jobs not through the unloading treatment of moving the carrier 2500 away from the treatment chamber, and not through the loading treatment of approaching the carrier 2500 to the treatment chamber, between the plurality of jobs.

For instance, the control device 5 can determine whether the carrier 2500 is subjected to the loading treatment or not, before the first job out of the plurality of jobs is executed, and when the carrier 2500 is not subjected to the loading treatment, subject the carrier 2500 to the loading treatment and execute the first job. In other words, when the test conveyance of the wafer is started, if the carrier 2500 is in a state of having been subjected to the unloading treatment from the treatment chamber, the control device 5 subjects the carrier 2500 to the loading treatment, thereby approaches the carrier 2500 to the treatment chamber, and makes the carrier dock with the treatment chamber.

Subsequently, the control device 5 executes the first job out of the plurality of jobs concerning the test conveyance of the substrate. Specifically, the control device 5 takes the wafer out from the carrier 2500, conveys the wafer in the treatment chamber, and returns the wafer of which the conveyance has been finished to the carrier 2500. When the first job has been finished, the control device 5 executes a next job, without subjecting the carrier 2500 to the unloading treatment and the loading treatment (in state in which carrier 2500 is docked with treatment chamber). By repeating this operation, the control device 5 continuously executes the plurality of jobs, by executing the next job after one job has been finished, not through the unloading treatment and the loading treatment.

In addition, the control device 5 can set the number of the wafers to be conveyed or the finish time, as a termination condition of the continuous execution of the plurality of jobs. The control device 5 determines whether the termination condition is satisfied or not, while the plurality of jobs are continuously executed, and when the termination condition has been satisfied, the control device 5 subjects the carrier 2500 to the unloading treatment and finishes the substrate test. Specifically, when the last job has been finished (termination condition has been satisfied), the control device 5 subjects the carrier 2500 to the unloading treatment, and thereby moves the carrier 2500 away from the treatment chamber and returns it to the predetermined place.

As has been described above, according to the present embodiment, the carrier 2500 is not subjected to the loading treatment and the unloading treatment between the executions of the plurality of jobs, and accordingly as a result, the plurality of jobs can be efficiently executed.

In addition, the control device 5 can continuously execute the plurality of jobs in order of registration or at random. According to this operation, the control device can continuously execute the plurality of jobs in order of registration (order of creation) or at random, accordingly subject the wafer to the test conveyance in various variations, and as a result, contribute to the enhancement of the reliability of the CMP apparatus.

In addition, as has been described above, the carrier 2500 can accommodate the plurality of wafers therein. The control device 5 can execute the plurality of jobs on a wafer which has been assigned by the plurality of jobs, out of a plurality of wafers that have been accommodated in the carrier 2500. Thereby, the control device can execute the test conveyance on an arbitrary wafer out of the plurality of wafers that have been accommodated in the carrier 2500, and accordingly can execute the test conveyance on the wafer, for instance, without the replacement of the wafers in the carrier 2500. As a result, the test conveyance of the wafer can be more efficiently performed.

Incidentally, in the present embodiment, it has been described that the wafer which has been accommodated in one carrier 2500 is subjected to the test conveyance, but the present embodiment is not limited to the description, and a plurality of carriers 2500 can be also provided. In this case, the control device 5 can execute the plurality of jobs simultaneously (in parallel) on the wafers which have been accommodated in each of the plurality of carriers 2500. Thereby, the plurality of wafers which have been accommodated in the plurality of carriers 2500 can be simultaneously subjected to the test conveyance, accordingly a time period of the test conveyance can be shortened, and as a result, the test conveyance of the wafer can be more efficiently performed.

<Control Flow Chart>

Figure 21:
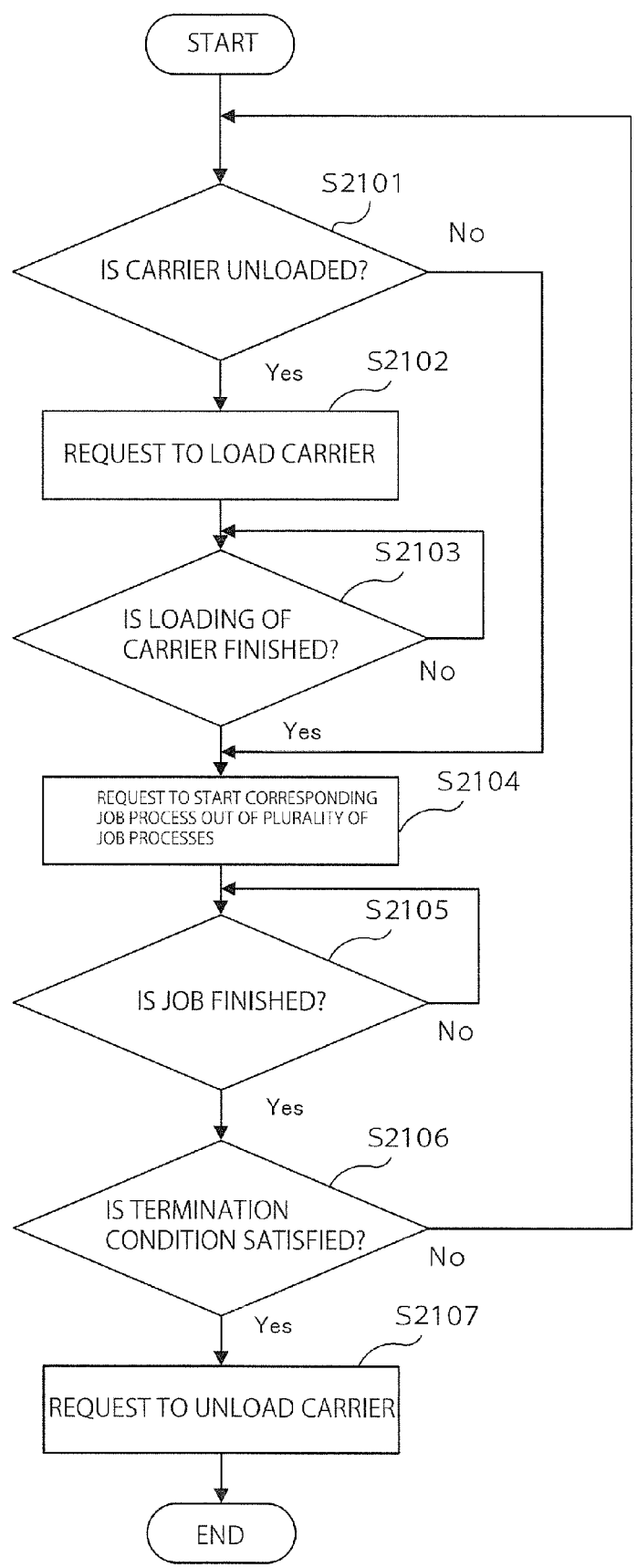
FIG. 21 is a view showing a flow of processing by the control device.

Next, a flow of processing by the control device 5 will be described below. FIG. 21 is a view showing the flow of processing by the control device.

As is shown in FIG. 21, when the test conveyance of the wafer has been started, the control device 5 determines whether the carrier 2500 is unloaded or not (whether carrier 2500 exists at predetermined position which is distant from treatment chamber, or not) (step S2101).

Subsequently, when having determined that the carrier 2500 is unloaded (Yes, in step S2101), the control device 5 outputs a request to subject the carrier 2500 to the loading treatment (step S2102). Subsequently, the control device 5 determines whether the loading treatment of the carrier 2500 has been finished or not (step S2103), and when having determined that the loading treatment of the carrier 2500 is not finished (No, in step S2103), the control device 5 repeats the processing of the step S2103.

Thereby, the carrier 2500 which exists in the predetermined position that is distant from the treatment chamber is subjected to the loading treatment, and as a result, the carrier 2500 approaches the treatment chamber and is docked with the treatment chamber (CMP apparatus). Incidentally, the steps S2102 and 2103 are executed only in the case where the first job process out of the plurality of job processes is executed.

When having determined that the loading treatment of the carrier 2500 has been finished (Yes, in step S2103), the control device 5 outputs a request to start the corresponding job process out of the plurality of job processes to be executed (step S2104). Specifically, the control device 5 selects a job to be executed out of the plurality of jobs which are stored in the storage device, and outputs a request to start the selected job process. Here, the job to be executed is a job which complies with the order of the registration, in the case where the plurality of jobs are executed in order of the registration, and is a job which has been selected at random, in the case where the plurality of jobs are executed at random.

Subsequently, the control device 5 determines whether the job process has been finished or not (step S2105), and when having determined that the job process is not finished (No, in step S2105), the control device 5 repeats the processing of the step S2105.

Thereby, the CMP apparatus takes out the wafer from the carrier 2500 according to the content of the job process which has been requested to be started, conveys the taken out wafer in the treatment chamber, and returns the wafer of which the conveyance has been finished, to the carrier 2500.

Subsequently, the control device 5 determines whether the termination condition for the continuous execution of the plurality of jobs is satisfied or not (step S2106). As for the termination condition, the number of the wafers to be conveyed or the finish time, for instance, have been previously set, and can be stored in the storage device of the control device 5, and the like.

When having determined that the termination condition has been satisfied (Yes, in step S2106), the control device 5 outputs a request to subject the carrier 2500 to the unloading treatment (step S2107), and finishes the test conveyance treatment. Thereby, the carrier 2500 is undocked from the treatment chamber (CMP apparatus), is moved away from the treatment chamber, and is returned to the predetermined place. Incidentally, the step S2107 is executed only after the last job process out of the plurality of job processes has been executed.

On the other hand, when having determined that the termination condition is not satisfied (No, in step S2106), the control device 5 returns to the processing of the step S2101, and repeats the processes after the step S2101. Here, the control device 5 determines whether the carrier 2500 is unloaded or not (step S2101), but when executing the jobs of the second time and later, the carrier 2500 is in a state of having been subjected to the loading treatment, and accordingly the carrier 2500 is not unloaded (No, in step S2101).

In this case, the control device 5 proceeds to the processing of the step S2104, and outputs a request to start the corresponding job process out of the plurality of job processes to be executed (step S2104).

Thus, when the jobs of the second time and later are executed, the next job process is executed without the processing of subjecting the carrier 2500 to the unloading treatment and the loading treatment after the execution of the previous job has been finished. Accordingly, according to the present embodiment, the carrier 2500 is not subjected to the loading treatment and the unloading treatment between the executions of the plurality of jobs, and accordingly as a result, the plurality of jobs can be efficiently executed.

REFERENCE SIGNS LIST

2 Loading/unloading unit
3 Polishing unit
4 Cleaning unit
5 Control device
250, 350 and 450 Components
260, 360 and 460 Sequencers
510 Interface-related APSW
512 Recipe-editing APSW
514 APSW for creating job for automatic conveyance
516 APSW for operating single body of unit
518 Parameter-editing APSW
520 Control-related APSW
522 Recipe management APSW
524 Job management/control APSW
526 APSW for operating single body of unit
528 Parameter management APSW
530 Task monitoring APSW
540 Shared memory
550 Display device
560 Communication driver
610 Title display region
620 Submenu display region
630 Main menu display region
640 Display region
650 Submenu button
660 Main menu button
1512 Input operation unit
1514 Storage unit
1516 Display unit
1520 Display control device
1522 Receiving unit
1524 Storage control unit
1526 Display control unit
1608 Base image
1620 Monitoring-related image
1630, 640 and 650 Operation-related images
2500 Carrier
W Wafer

What is claimed is:

1. A control device of a substrate treatment apparatus comprising:
    a plurality of software applications configured to execute a plurality of functions of treatments concerning the substrate treatment apparatus, each software application executing each function of the plurality of functions;
    a storage device configured to store information that is used in the plurality of software applications therein, wherein
    the plurality of software applications include a monitoring software application which monitors whether abnormality has occurred in one or more of the plurality of software applications or not, wherein
    when the abnormality has occurred in one or more of the plurality of software applications, the monitoring software application restarts the one or more of the plurality of software applications in which the abnormality has occurred, and makes the software applications other than the software application in which the abnormality has occurred continue the respective processes,
    wherein the control device further comprises a display device which functions as an interface of information, wherein
    the plurality of software applications comprise: an interface-related software application configured to execute input and output processes of the information through the display device; and a control-related software application configured to execute an operation process of the substrate treatment apparatus on the basis of the input information which has been input by the interface-related software application, or a storage process of the input information into the storage device; and
    when the abnormality has occurred in any one of the interface-related software application and the control-related software application, the monitoring software application restarts the software application in which the abnormality has occurred, and makes the other software application continue the processing;
    wherein the interface-related software application comprises:
    at least two of a recipe-editing software application configured to edit recipes concerning the substrate treatment of the substrate treatment apparatus, a job-editing software application configured to edit jobs of the substrate treatment apparatus, which are created by combining the recipes, a unit adjustment software application configured to input a command for a test or adjustment of units included in the substrate treatment apparatus, and a parameter-editing software application configured to edit parameters which are used in the substrate treatment apparatus, wherein
    when the abnormality has occurred in any of at least two of the recipe-editing software application, the job-editing software application, the unit adjustment software application and the parameter-editing software application, the monitoring software application restarts the software application in which the abnormality has occurred, and makes the software applications other than the software application in which the abnormality has occurred continue the processing.

2. The control device of the substrate treatment apparatus according to claim 1, wherein
    the control-related software application comprises:
    at least two of a recipe management software application configured to store recipes which have been edited through the recipe-editing software application, into the storage device,
    a job management/control software application configured to store jobs which have been edited through the job-editing software application, into the storage device, and also make the substrate treatment apparatus operate on the basis of the jobs, a unit operation software application configured to make a unit included in the substrate treatment apparatus operate on the basis of a command which has been input through the unit adjustment software application, and
a parameter management software application configured to store parameters which have been edited through the parameter-editing software application, into the storage device; wherein
when the abnormality has occurred in any of at least two of the recipe management software applications, the job management/control software application, the unit operation software application and the parameter management software application, the monitoring software applications restarts the software application in which the abnormality has occurred, and makes the software applications other than the software application in which the abnormality has occurred continue the processing.

3. A substrate treatment apparatus comprising:
a plurality of software applications configured to execute a plurality of functions of treatments concerning the substrate treatment apparatus, each software application executing each function of the plurality of functions;
a storage device configured to store information that is used in the plurality of software applications therein, wherein
the plurality of software applications include a monitoring software application which monitors whether abnormality has occurred in one or more of the plurality of software applications or not, wherein
when the abnormality has occurred in one or more of the plurality of software applications, the monitoring software application restarts the one or more of the plurality of software applications in which the abnormality has occurred, and makes the other software applications other than the software application in which the abnormality has occurred continue the respective processes,
wherein the control device further comprises a display device which functions as an interface of information, wherein
the plurality of software applications comprise: an interface-related software application configured to execute input and output processes of the information through the display device; and a control-related software application configured to execute an operation process of the substrate treatment apparatus on the basis of the input information which has been input by the interface-related software application, or a storage process of the input information into the storage device; and
when the abnormality has occurred in any one of the interface-related software application and the control-related software application, the monitoring software application restarts the software application in which the abnormality has occurred, and makes the other software application continue the processing;
wherein the interface-related software application comprises:
at least two of a recipe-editing software application configured to edit recipes concerning the substrate treatment of the substrate treatment apparatus, a job-editing software application configured to edit jobs of the substrate treatment apparatus, which are created by combining the recipes, a unit adjustment software application configured to input a command for a test or adjustment of units included in the substrate treatment apparatus, and a parameter-editing software application configured to edit parameters which are used in the substrate treatment apparatus, wherein
when the abnormality has occurred in any of at least two of the recipe-editing software application, the job-editing software application, the unit adjustment software application and the parameter-editing software application, the monitoring software application restarts the software application in which the abnormality has occurred, and makes the software applications other than the software application in which the abnormality has occurred continue the processing;
a polishing unit configured to perform a polishing treatment of a substrate;
a cleaning unit configured to perform a cleaning treatment and a drying treatment of the substrate; and
a loading/unloading unit configured to deliver the substrate to the polishing unit and also receive the substrate which has been subjected to the cleaning treatment and the drying treatment in the cleaning unit.

4. A substrate treatment apparatus according to claim 3, comprising:
a treatment chamber configured to polish or clean a substrate therein; and
a control device configured to continuously execute a plurality of jobs concerning a test conveyance of the substrate in the treatment chamber, wherein
the control device continuously executes the plurality of jobs while maintaining a state in which the carrier is docked with treatment chamber.

5. The substrate treatment apparatus according to claim 4, wherein
the control device continuously executes the plurality of jobs in order of registration or at random.

6. The substrate treatment apparatus according to claim 4, wherein
the carrier can accommodate a plurality of substrates therein, each of the plurality of jobs is assigned with one or more substrates out of the plurality of substrates, and the control device executes each of the plurality of jobs on the one or more substrates with which the job is assigned.

7. The substrate treatment apparatus according to claim 4, wherein
the control device determines whether the carrier is subjected to the loading treatment or not, before the first job out of the plurality of jobs is executed, and when the carrier is not subjected to the loading treatment, subjects the carrier to the loading treatment and executes the first job.

8. The substrate treatment apparatus according to claim 4, wherein
the substrate treatment apparatus can set the number of the substrates to be conveyed or the finish time, as a termination condition for continuous execution of the plurality of jobs, and the control device determines whether the termination condition is satisfied or not while the plurality of jobs are continuously executed, and when the termination condition has been satisfied, subjects the carrier to the unloading treatment and finishes the substrate test.

9. The substrate treatment apparatus according to claim 4, wherein
the plurality of carriers are provided, and the control device executes the plurality of jobs simultaneously to the substrates which are accommodated in each of the plurality of carriers.

* * * * *